United States Patent
Shin et al.

(10) Patent No.: US 10,684,654 B2
(45) Date of Patent: Jun. 16, 2020

(54) HEAD-MOUNTED DISPLAY DEVICE WITH DETACHABLE DEVICE

(71) Applicant: Samsung Electronics Co., Ltd., Gyeonggi-do (KR)

(72) Inventors: Shong Uk Shin, Gyeonggi-do (KR); Dong Il Son, Gyeonggi-do (KR); Chi Hyun Cho, Gyeonggi-do (KR); Jong Chul Choi, Gyeonggi-do (KR); Chang Ryong Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 32 days.

(21) Appl. No.: 15/293,850

(22) Filed: Oct. 14, 2016

(65) Prior Publication Data

US 2017/0153672 A1    Jun. 1, 2017

(30) Foreign Application Priority Data

Nov. 30, 2015 (KR) .................. 10-2015-0168603

(51) Int. Cl.
*G09G 1/00* (2006.01)
*G06F 1/16* (2006.01)
(Continued)

(52) U.S. Cl.
CPC ....... *G06F 1/1654* (2013.01); *G02B 27/0093* (2013.01); *G02B 27/0176* (2013.01); *G06F 1/163* (2013.01); *G06F 1/169* (2013.01); *G06F 1/1632* (2013.01); *G06F 1/1694* (2013.01); *G06F 1/1698* (2013.01); *H04M 1/23* (2013.01);
(Continued)

(58) Field of Classification Search
CPC ......... G02B 27/01; G06F 3/044; G06F 1/163; G06F 1/169; G06F 1/1698
See application file for complete search history.

(56) References Cited

U.S. PATENT DOCUMENTS 6,319,034 B1   11/2001   Takakura et al.
8,957,835 B2   2/2015   Hoellwarth
(Continued)

FOREIGN PATENT DOCUMENTS

EP    1 594 080    11/2005

OTHER PUBLICATIONS

International Search Report dated Dec. 14, 2016 issued in counterpart application No. PCT/KR2016/011009, 12 pages.
(Continued)

*Primary Examiner* — Michael A Faragalla
(74) *Attorney, Agent, or Firm* — The Farrell Law Firm, P.C.

(57) ABSTRACT

A head-mounted device including a main frame couplable to an electronic device and a support part configured to affix the main frame to a facial side of the user, and an auxiliary input device including a body, an input module disposed on at least one surface of the body and configured to process an input signal for controlling a function of the electronic device, a sensor module disposed in the body and configured to obtain sensing information in accordance with a movement of the auxiliary input device, and a connection part electrically connectable to the electronic device and configured to serve as a path through which the input signal and the sensing information are transmitted to the electronic device is provided.

12 Claims, 21 Drawing Sheets

(51) Int. Cl.
  G02B 27/00     (2006.01)
  G02B 27/01     (2006.01)
  H04M 1/23      (2006.01)
  H04M 1/725     (2006.01)
  H04M 1/02          (2006.01)
  G06F 3/0354        (2013.01)
  G06F 3/0362        (2013.01)

(52) U.S. Cl.
  CPC ....... H04M 1/72527 (2013.01); *G06F 3/0362* (2013.01); *G06F 3/03547* (2013.01); *G06F 3/03549* (2013.01); *G06F 2200/1637* (2013.01); *H04M 1/0274* (2013.01); *H04M 2250/12* (2013.01); *H04M 2250/22* (2013.01)

(56) References Cited

U.S. PATENT DOCUMENTS

| | | | |
|---|---|---|---|
| 9,176,325 | B2 | 11/2015 | Lyons |
| 9,274,340 | B2 | 3/2016 | Lyons |
| 9,377,626 | B2 | 6/2016 | Lyons |
| 9,429,759 | B2 | 8/2016 | Hoellwarth |
| 2010/0079356 | A1 | 4/2010 | Hoellwarth |
| 2012/0113605 | A1 | 5/2012 | Zhang et al. |
| 2014/0152531 | A1* | 6/2014 | Murray .................. G06F 1/1632 345/8 |
| 2014/0320383 | A1 | 10/2014 | Goto et al. |
| 2015/0198811 | A1 | 7/2015 | Hoellwarth |
| 2015/0234189 | A1* | 8/2015 | Lyons ................ G02B 27/0172 345/174 |
| 2015/0234192 | A1 | 8/2015 | Lyons |
| 2015/0234193 | A1 | 8/2015 | Lyons |
| 2015/0234501 | A1 | 8/2015 | Lyons |
| 2015/0235426 | A1 | 8/2015 | Lyons |
| 2015/0253574 | A1* | 9/2015 | Thurber ............. G02B 27/0172 359/630 |
| 2016/0085076 | A1 | 3/2016 | Hoellwarth |
| 2016/0253006 | A1 | 9/2016 | Lyons |
| 2016/0305782 | A1* | 10/2016 | Al-Hamad ............ G01C 21/16 |

OTHER PUBLICATIONS

European Search Report dated Jul. 12, 2018 issued in counterpart application No. 16870902.0-1221, 11 pages.
European Search Report dated Jan. 22, 2020 issued in counterpart application No. 16870902.0/1203, 11 pages.

* cited by examiner

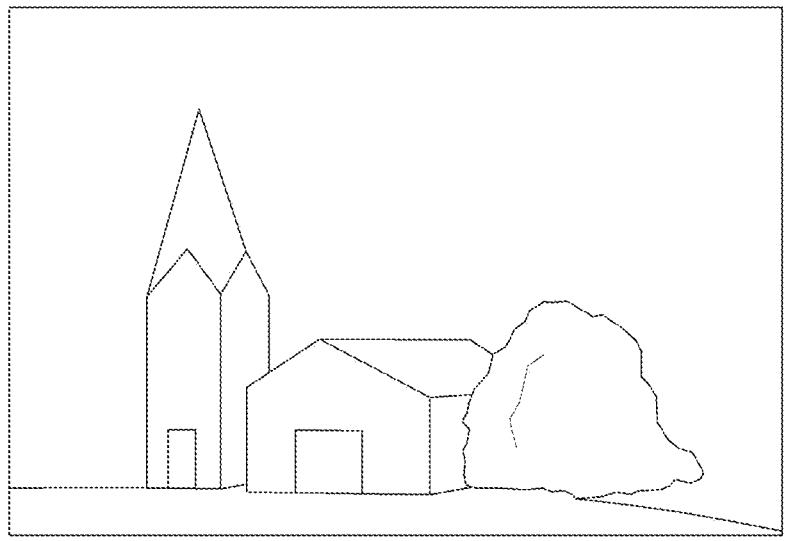
FIG.15A Normal mode [Monoscopic]
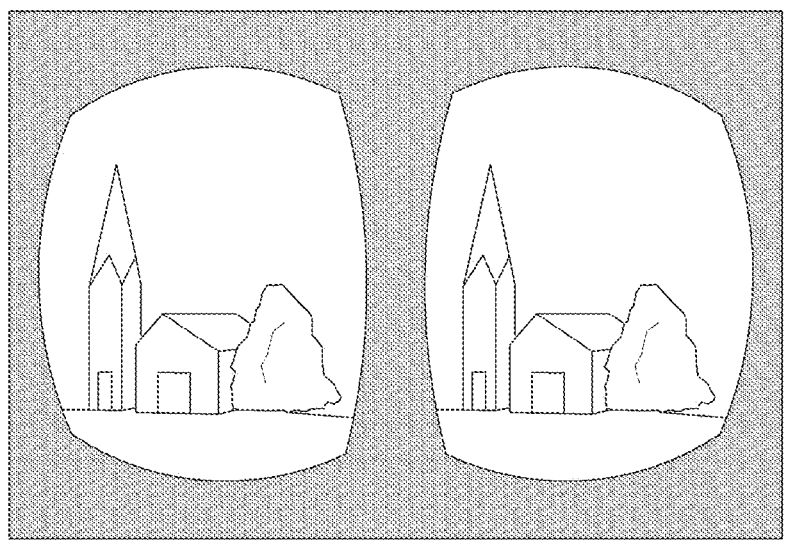
FIG.15B HMM mode [Stereoscopic]

PIP mode

See-through mode

HEAD-MOUNTED DISPLAY DEVICE WITH DETACHABLE DEVICE

PRIORITY

This application claims priority under 35 U.S.C. § 119(a) to a Korean Patent Application filed on Nov. 30, 2015 in the Korean Intellectual Property Office and assigned Serial number 10-2015-0168603, the entire disclosure of which is incorporated herein by reference.

BACKGROUND

1. Field of the Disclosure

The present disclosure relates generally to a head-mounted display device (HMD) with a detachable device, and more particularly, to an HMD with a detachable device provided with a sensor module or an input module.

2. Description of the Related Art

In recent years, various wearable electronic devices that may be worn directly on a user's body have been developed. If wearable electronic devices are worn directly on a user's body, mobility and portability of the wearable electronic devices are improved. Wearable electronic devices worn on a part of a user's body or clothing include various devices, such as an HMD, smart glasses, a smart watch or wristband, a contact lens-type device, a ring-type device, a shoe-type device, a clothing-type device, a glove-type device, etc., and a wearable electronic device may be formed to have a shape that is attachable to and detachable from a part of a user's body or clothing. In particular, an HMD may be provided in a goggle-like form or a glasses-like form and mounted on a user's head.

An HMD may be integrated with an electronic device (e.g., a smart phone) or attachable to and detachable from an electronic device to display an image through a screen of the electronic device. In addition, an HMD may include a sensor module (e.g., a six-axis sensor) for sensing movement of a user's head or an input module (e.g., a touch pad) for receiving a user input (e.g., a touch input or a gesture input). An HMD may control functions of an electronic device based on information obtained through a sensor module or an input module.

A sensor module and an input module may be integrated with a main frame (or body) of an HMD. Accordingly, in a case where an HMD may need to be replaced, e.g., in a case where an electronic device integrated with an HMD may malfunction or the electronic device may not fit into a main frame of an HMD due to a change in size or appearance of the electronic device, the sensor module and the input module may need to be replaced with the main frame of the HMD. However, optical members, such as a lens, of an HMD may be required to be replaced in accordance with the size or appearance of an HMD, but a sensor module and an input module are not necessary need to be replaced.

SUMMARY

An aspect of the present disclosure is to provide an HMD and a device (hereinafter, referred to as an auxiliary input device) that is attachable to and detachable from the HMD or an electronic device and provided with a sensor module or an input module.

In accordance with an aspect of the present disclosure, a head-mounted system is provided. The head-mounted device includes a main frame couplable to an electronic device and a support part configured to affix the main frame to a facial side of the user, and an auxiliary input device including a body, an input module disposed on at least one surface of the body and configured to process an input signal for controlling a function of the electronic device, a sensor module disposed in the body and configured to obtain sensing information in accordance with a movement of the auxiliary input device, and a connection part electrically connectable to the electronic device and configured to serve as a path through which the input signal and the sensing information are transmitted to the electronic device.

In accordance with another aspect of the present disclosure, an electronic device detachably attached to a mobile electronic device to provide a signal is provided. The electronic device includes a housing including a first surface, a second surface facing an opposite side of the first surface, and a side surface surrounding at least a portion of a space between the first surface and the second surface; at least one touch sensor disposed on at least one of the first surface, the second surface, and the side surface of the housing; at least one sensor disposed in the housing; a communication circuit disposed in the housing; and a control circuit electrically connected to the at least one touch sensor, the at least one sensor, and the communication circuit, wherein the communication circuit is configured to obtain a gesture or touch input from a user using the at least one touch sensor, obtain information associated with at least one of an orientation and a movement of the electronic device using the at least one sensor, and transmit at least one of the gesture or touch input and the information to the mobile electronic device using the communication circuit.

In accordance with another aspect of the present disclosure, a mobile electronic device detachably attached to a head-mounted display device worn on a head of a user is provided. The mobile electronic device includes a communication circuit; a display; a processor electrically connected to the communication circuit and the display; and a memory electrically connected to the processor, wherein the memory is configured to store instructions, if executed by the processor, which causes the processor to receive at least one input signal from an external sensing device using the communication circuit, display content associated with the head-mounted display device through at least a portion of the display based on at least a portion of the obtained at least one input signal, receive information on at least one of an orientation and a movement of the external sensing device, which are obtained by the external sensing device, from the external sensing device, and change the content displayed on the display based on the received information.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 15A and 15B are illustrations of a normal mode, a head-mounted mode (HMM), and a virtual reality (VR) mode according to an embodiment of the present disclosure.

DETAILED DESCRIPTION OF EMBODIMENTS OF THE PRESENT DISCLOSURE

Figure 1:
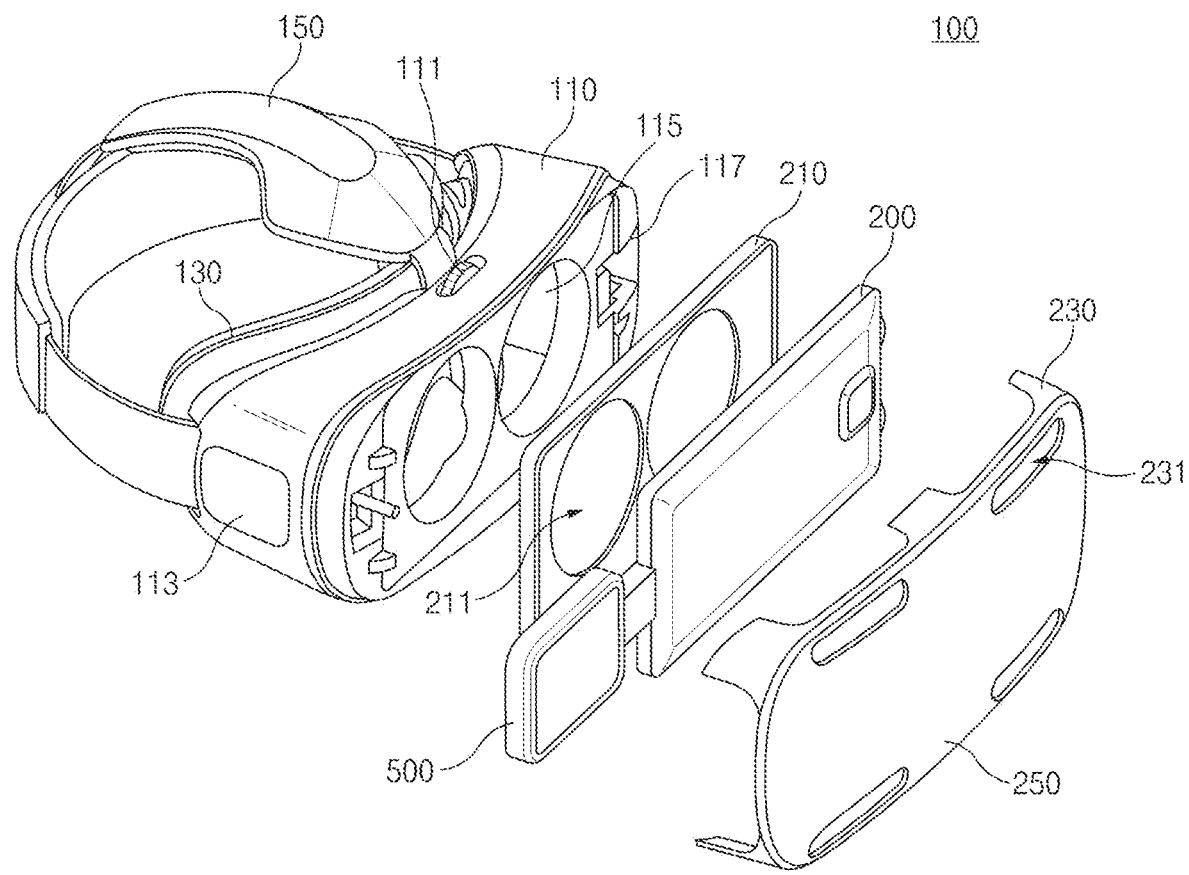
FIG. 1 is an exploded perspective view of an HMD according to an embodiment of the present disclosure.

Hereinafter, various embodiments of the present disclosure are described with reference to the accompanying drawings. Accordingly, those of ordinary skill in the art will recognize that modification, equivalent, and/or alternative on the various embodiments described herein may be variously made without departing from the scope and spirit of the present disclosure. With regard to the descriptions of the accompanying drawings, similar components may be marked by similar reference numerals.

In the present disclosure, the terms "have," "may have," "include," "comprise," "may include," and "may comprise" used herein indicate the existence of corresponding features (e.g., elements such as numeric values, functions, operations, or components) but do not exclude the presence of additional features.

In the present disclosure, the terms "A or B," "at least one of A and/or B," "one or more of A and/or B," and the like used herein may include any and all combinations of one or more of the associated listed items. For example, the terms "A or B," "at least one of A and B," and "at least one of A or B" may refer to all of the case (1) where at least one A is included, the case (2) where at least one B is included, and the case (3) where both of at least one A and at least one B are included.

The terms, such as "first," "second," and the like used herein may refer to various elements of various embodiments of the present disclosure, but are not intended to limit the elements. For example, such terms are not intended to limit the order and/or priority of the elements. Furthermore, such terms may be used to distinguish one element from another element. For example, "a first user device" and "a second user device" indicate different user devices. For example, without departing from the scope and spirit of the present disclosure, a first element may be referred to as a second element, and similarly, a second element may be referred to as a first element.

If an element (e.g., a first element) is referred to as being "(operatively or communicatively) coupled with/to" or "connected to" another element (e.g., a second element), the element may be directly coupled with/to or connected to the other element or an intervening element (e.g., a third element) may be present. In contrast, if an element (e.g., a first element) is referred to as being "directly coupled with/to" or "directly connected to" another element (e.g., a second element), it should be understood that there is no intervening element (e.g., no third element).

The expression "configured to" used herein may be used as, for example, the expression "suitable for," "having the capacity to," "designed to," "adapted to," "made to," or "capable of." The term "configured to" does not indicate only "specifically designed to" in hardware. Instead, the term "a device configured to" may indicate that the device is "capable of" operating together with another device or other components. For example, a "processor configured to perform A, B, and C" may indicate a dedicated processor (e.g., an embedded processor) for performing a corresponding operation or a general purpose processor (e.g., a central processing unit (CPU) or an application processor) which may perform corresponding operations by executing one or more software programs which are stored in a memory device.

Terms used in the present disclosure are used to describe certain embodiments of the present disclosure but are not intended to limit the scope of the present disclosure. The terms in singular forms may include plural forms unless otherwise specified. Unless otherwise defined herein, all the terms used herein, may have the same meanings that are generally understood by a person skilled in the art. Terms, which are defined in a dictionary and commonly used, should also be interpreted as is customary in the relevant related art and not in an idealized or overly formal manner unless expressly so defined herein in various embodiments of the present disclosure. In some cases, even terms defined in the present disclosure may not be intended to exclude embodiments of the present disclosure.

An electronic device according to an embodiment of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), mobile medical devices, cameras, or wearable devices. According to an embodiment of the present disclosure, the wearable devices may include at least one of accessory type wearable devices (e.g., watches, rings, bracelets, ankle bracelets, necklaces, glasses, contact lenses, or HMDs), textile/clothing type wearable devices (e.g., electronic apparel), body-attached type wearable devices (e.g., skin pads or tattoos), or bio-implantable type wearable devices (e.g., implantable circuits).

According to an embodiment of the present disclosure, the electronic devices may be smart home appliances. The smart home appliances may include at least one of, for example, televisions (TVs), digital versatile disc (DVD) players, audio players, refrigerators, air conditioners, cleaners, ovens, microwave ovens, washing machines, air cleaners, set-top boxes, TV boxes (e.g., Samsung HomeSync®, Apple TV®, or Google TV™), game consoles (e.g., Xbox® and PlayStation®), electronic dictionaries, electronic keys, camcorders, electronic picture frames, and the like.

According to, the electronic devices may include at least one of medical devices (e.g., various portable medical measurement devices (e.g., a blood glucose monitoring device, a heartbeat measuring device, a blood pressure measuring device, a thermometer, and the like)), a magnetic resonance angiography (MRA) device, a magnetic resonance imaging (MRI) device, a computed tomography (CT) device, scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices may be one or more combinations of the above-mentioned devices. An electronic device may be a flexible electronic device. However, electronic devices are not limited to the above-mentioned devices, but may include electronic devices to be developed.

The term "user" used herein may refer to a person who uses an electronic device or a device (e.g., an electronic device that includes artificial intelligence) that uses an electronic device.

Figure 2:
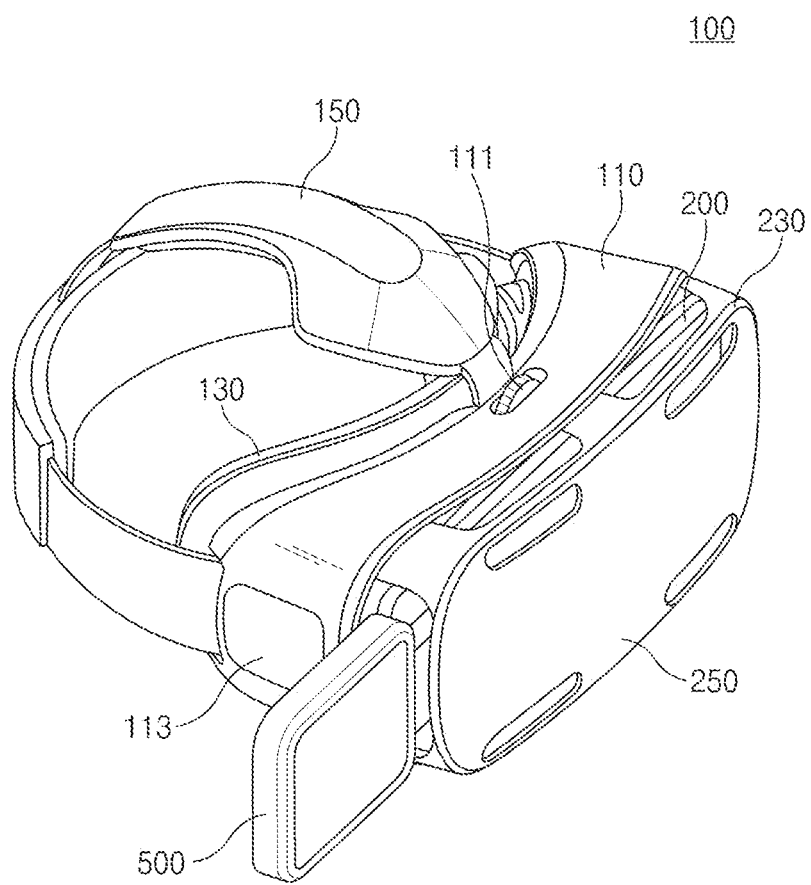
FIG. 2 is a perspective view of an HMD coupled to an auxiliary input device according to an embodiment of the present disclosure.
Figure 3:
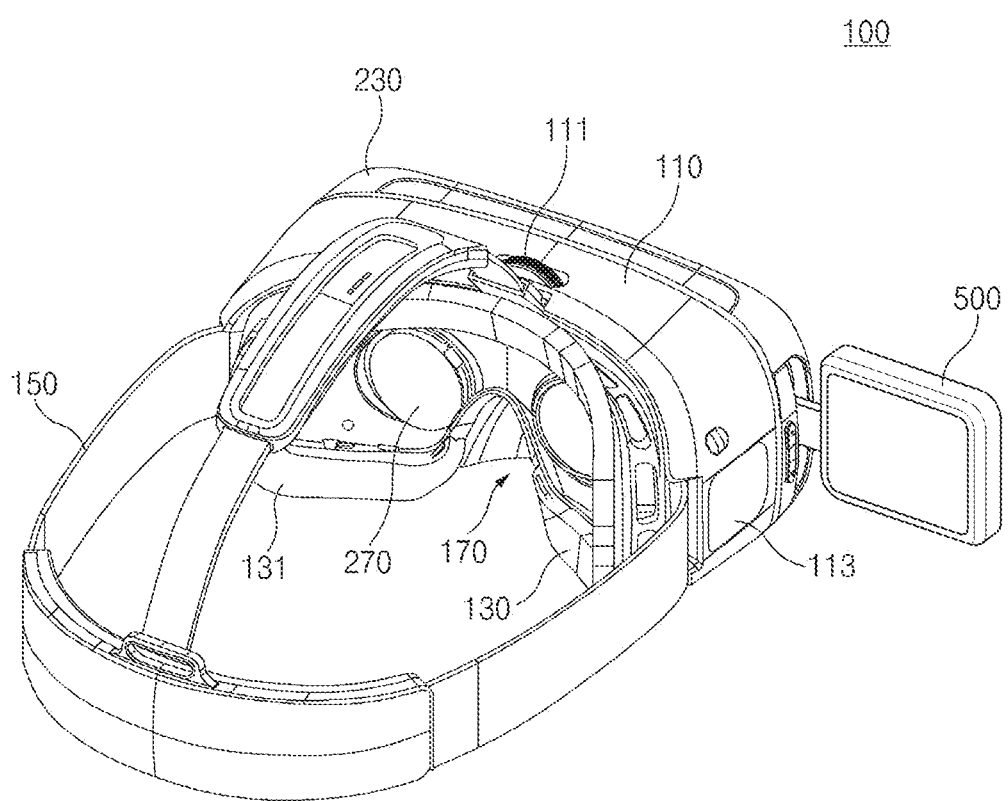
FIG. 3 is a rear perspective view of an HMD coupled to an auxiliary input device according to an embodiment of the present disclosure.
Figure 4:
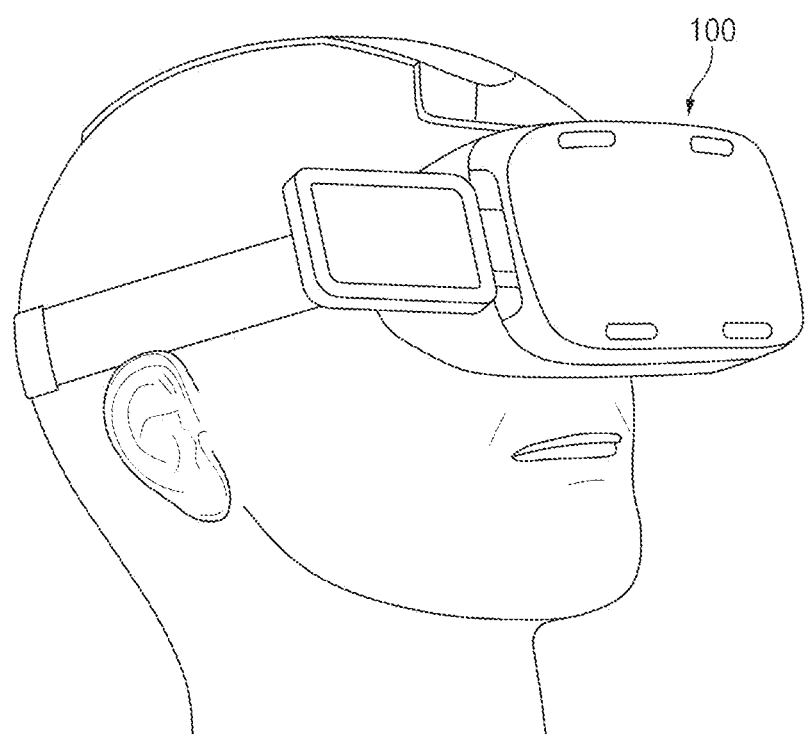
FIG. 4 is an illustration of a user wearing the HMD shown in FIG. 2.

FIG. 1 is an exploded perspective view of an HMD, FIG. 2 is a perspective view of an HMD coupled to an auxiliary input device, FIG. 3 is a rear perspective view of an HMD coupled to an auxiliary input device, and FIG. 4 is an illustration of a user wearing the HMD shown in FIG. 2, according to an embodiment of the present disclosure, respectively.

Referring to FIGS. 1 to 4, the HMD 100 may include a main frame 110 (or a frame structure) and a support part 150 (or a binding member) (e.g., a goggle band). According to an embodiment of the present disclosure, the HMD 100 may have a shape in which a portion of the support part 150 corresponding to an upper portion of a head of a user may be removed to leave only a portion of the support part 150 corresponding to a side portion of the head of the user.

The main frame 110 may be worn on at least a portion (e.g., a facial side) of a user and secured to a facial side by various components. According to an embodiment of the present disclosure, the main frame 110 may be constructed from a lightweight material, such as plastic, which provides a user with a comfortable fit and supports an electronic device 200 (e.g., a mobile electronic device). In addition, the main frame 110 may further include a material to protect the HMD 100.

According to an embodiment of the present disclosure, the material protecting the HMD 100 may include at least one of various materials, such as glass, plastic (e.g., acrylonitrile butadiene styrene (ABS) or polycarbonate), ceramic, metal (e.g., aluminum), or a metal alloy (e.g., steel, stainless steel, magnesium alloy, or the like).

According to an embodiment of the present disclosure, the support part 150 may include an adjustable length of a band formed of an elastic material to allow the main frame 110 to be in close contact with an eye area of a user's face, and cushions may be attached to the band to provide a comfortable fit in consideration of long wearing times. Additionally or generally, the support part 150 may be configured to include eyeglass temples, helmets, or straps.

Since a rear surface of the main frame 110 serves as a facial-side contact part 130 which makes contact with the face of a user, the rear surface of the main frame 110 may have a shape corresponding to a curve of a face and include an elastomer 131 as at least a portion thereof. The elastomer 131 may include at least one cushion material, such as a sponge, to provide a comfortable fit if the facial-side contact part 130 makes contact with the face of a user. The elastomer 131 may be configured to include one sponge or may have a shape obtained by laminating one or more sponges having different compression ratios. For example, the elastomer 131 may be a three-layered sponge (e.g., an upper layer, an intermediate layer, a lower layer), and in this case, the sponge with a low compression ratio may be applied to the upper and lower layers, and the sponge with a high compression ratio may be applied to the intermediate layer.

According to an embodiment of the present disclosure, the elastomer 131 may be attached to the main frame 110 to allow the elastomer 131 to be detachable from the main frame 110. The elastomer 131 may include an adhesive member provided on one surface thereof and may be attached to and detached from the main frame 110 by the adhesive member. The adhesive member may be Velcro®, a tape, or an adhesive, but it should not be limited thereto or thereby as long as it may be attached to and detached from the main frame 110. Accordingly, in a case where multiple users use one HMD 100, the users may select the elastomers appropriate to themselves (e.g., elastomers appropriate to adults or children having different facial contours). In a case where a surface of the elastomer 131 is contaminated (e.g., the surface of the elastomer 131 is stained with cosmetics or sweat) or the elastomer 131 is broken by frequent use, the HMD 100 may be used after the contaminated or broken elastomer 131 is replaced with another elastomer 131.

Considering the ease of wear on the face of a user, the main frame 110 of the HMD 100 in the present disclosure may have a shape or structure to cover a user's eye area, and the HMD 100 may include a nose recess 170 into which a user's nose is placed. A lens assembly including at least one lens 270 may be inserted into portions of the facial-side contact part 130, which corresponds to two eyes of the user. At least one surface of the lens 270 may be exposed through the facial-side contact part 130 to allow a user to see a screen of an electronic device 200 if a user wears the HMD 100.

According to an embodiment of the present disclosure, the main frame 110 may include a display position controller 111, a placing part 113 on which an auxiliary input device 500 is placed, and a lens fixing part 115. In addition, the main frame 110 may include a front case 117 provided with a space or a structure to which the electronic device 200 is coupled. The main frame 110 may further include a connector to communicate with the electronic device 200 coupled thereto.

According to an embodiment of the present disclosure, the connector may include an electrical connection part for the electronic device 200, for example, a universal serial bus (USB) connector connected to a USB port, and provide a signal of a graphics user interface (GUI) to the electronic device 200 through the electrical connection part.

According to an embodiment of the present disclosure, the display position controller 111 may be implemented by a wheel-like member or a dial-like member. If a user rotates the wheel or dial employed as the display position controller 111, the electronic device 200 may move to control a distance between the display of the electronic device 200 and the user, and as a result, the user may control the position of the electronic device 200 to view the image displayed in a suitable manner for his/her eyesight or optimally displayed.

The placing part 113 may have a concave shape such that the auxiliary input device 500 is placed on the main frame 110. According to an embodiment of the present disclosure, the placing part 113 may further include a coupling member to prevent the auxiliary input device 500 placed on the main frame 110 from inadvertently becoming separated. The coupling member may be implemented by a hook-like member, a magnet, or an electromagnet.

A display or a transparent/semi-transparent lens 270 may be integrally fixed to the lens fixing member 115 of the main frame 110 or detachably fixed to the lens fixing member 115. According to an embodiment of the present disclosure, a lens assembly may be inserted inbetween the display and the eyes of a user. The main frame 110 may include a soft material (e.g., a sponge, a piece of rubber, etc.) provided on a rear surface thereof to prevent the main frame 110 from excessively closing in on a user's eye area.

The front case 117 of the main frame 110 may correspond to the shape of the electronic device 200. According to an embodiment of the present disclosure, the front case 117 may include an elastic material or a flexible material to vary a size thereof, and thus the front case 117 may accommodate various sizes of the electronic device 200.

According to an embodiment of the present disclosure, the front case 117 may be coupled to an adaptor 210 used to allow the electronic device 200 to be mounted on the main frame 110. The adaptor 210 may be connected between the electronic device 200 and the main frame 110 to align the display screen of the electronic device 200 with the lens 270 of the main frame 110. The adaptor 210 may include at least one opening 211 to allow a user to view the display screen of the electronic device 200 through the lens 270. In addition, the adaptor 210 may be changed in accordance with the size or the appearance of the electronic device 200. Furthermore, the front case 117 may further include a fixing member such that the adaptor 210 with various sizes or appearances may be fixed to a surface of the front case 117 connected to the adaptor 210.

The HMD 100 according to an embodiment of the present disclosure may further include a cover 230 to more securely support the electronic device 200 to the main frame 110 while the electronic device 200 is coupled to the main frame 110. The cover 230 may be physically coupled to the main frame 110 in the manner of a hook, a magnet, or an electromagnet. As described above, the cover 230 may prevent the electronic device 200 from inadvertently becoming separated from the main frame 110, form the appearance of the main frame 110, and improve aesthetics.

According to an embodiment of the present disclosure, the cover 230 may further include a window 250 arranged on a front surface thereof, and the window 250 may be made of various materials and colors to improve aesthetics. The window 250 may be manufactured using a plastic material, such as acryl, a ceramic material, such as glass, sapphire, a transparent ceramic, etc., or a metal material, such as aluminum, stainless steel, etc. A transparent material may have colors to control transparency.

In addition, the cover 230 may further include one or more additional openings 231. A heat generated by the electronic device 200 may be easily discharge through the opening 231 to the outside of the cover 230. Accordingly, the temperature of the electronic device 200 may be lowered to prevent performance degradation of the electronic device 200. Further, the weight of the cover 230 may be reduced due to the one or more openings 231, and thus a total weight of the HMD 100 may be reduced.

According to an embodiment of the present disclosure, the auxiliary input device 500 (or a sensing device) may be attached to and detached from a surface (e.g., a side surface) of the electronic device 200. The auxiliary input device 500 may include a connection part to be attached to and detached from the electronic device 200 or the main frame 110. The connection part may include, for example, a USB connector connected to a USB port of the electronic device 200 or a USB port of the main frame 110. A signal of a sensor module or an input module included in the auxiliary input device 500 may be applied to the electronic device 200 through an electrical connection part of a USB connector.

The auxiliary input device 500 may include a sensor module, an input module, and control functions of the electronic device 200 based on information obtained by the sensor module and the input module.

A sensor module included in the auxiliary input device 500 may measure a physical quantity or sense an operation status of the auxiliary input device 500 and convert the measured or sensed information to an electrical signal. A sensor module may include, for example, an acceleration sensor, a gyro sensor, or a geomagnetic field sensor. According to an embodiment of the present disclosure, if the auxiliary input device 500 is connected to the electronic device 200 coupled to the HMD 100 or the main frame 110, a sensor module may obtain information on an orientation and/or a movement of the auxiliary input device 500 to sense a movement of the head of a user.

An input module included in the auxiliary input device 500 may receive a user input (e.g., a touch input or a gesture input). An input module may include, for example, at least one of a touch pad, a trackball, a wheel key, a physical key, a physical button, a touch key, or a joystick. According to an embodiment of the present disclosure, an input module may provide a GUI to control the functions of the electronic device 200. For example, a GUI associated with setting a sound level may control the audio volume of the electronic device 200, and a GUI associated with image reproduction may control an image displayed in the electronic device 200. In addition, an input module may receive a touch input or a hovering input of a user.

The electronic device 200 may control a function corresponding to a touch input in response to a touch input provided from the auxiliary input device 500. For example, the electronic device 200 may control audio volume or image reproduction in response to a touch input applied thereto.

Figure 5A:
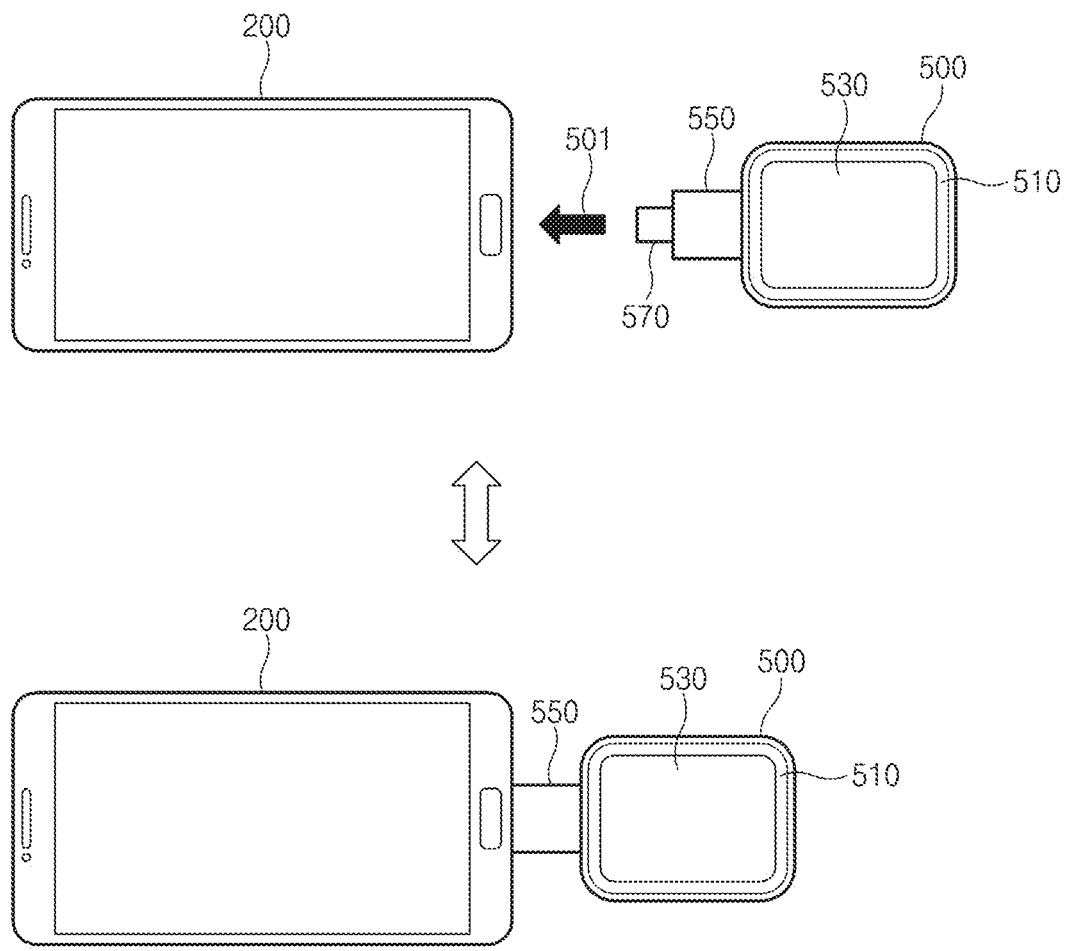
FIG. 5A is a diagram of an auxiliary input device detached from and attached to an HMD or an electronic device, respectively, according to an embodiment of the present disclosure.
Figure 5B:
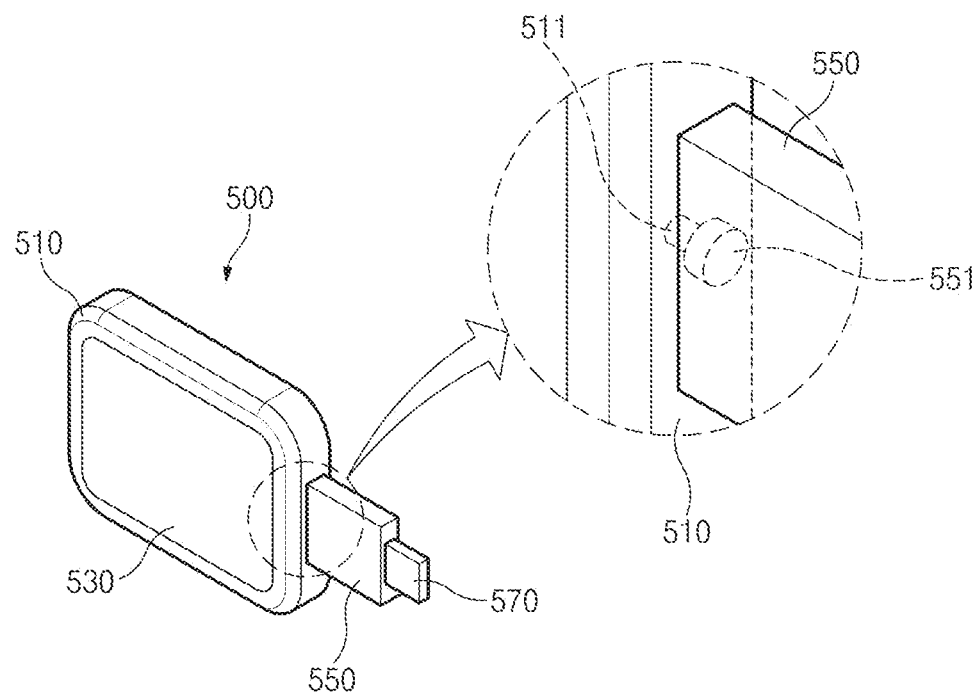
FIG. 5B is a perspective view of an auxiliary input device according to an embodiment of the present disclosure.
Figure 5C:
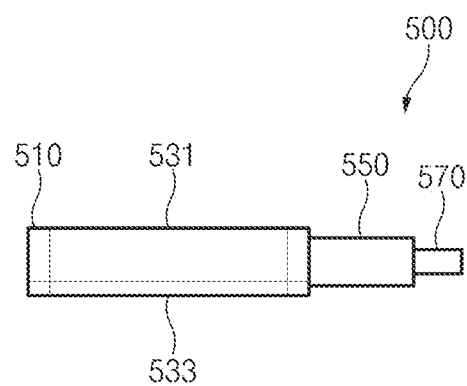
FIG. 5C is a side view of an auxiliary input device according to an embodiment of the present disclosure.

FIG. 5A is a diagram of an auxiliary input device detached from and attached to an HMD or an electronic device, respectively, according to an embodiment of the present disclosure, FIG. 5B is a perspective view of an auxiliary input device according to an embodiment of the present disclosure, and FIG. 5C is a side view of an auxiliary input device according to an embodiment of the present disclosure.

Referring to FIGS. 5A to 5C, the auxiliary input device 500 (or sensing device) may include a body 510 (or housing), an extension part 550, and a connection part 570. According to an embodiment of the present disclosure, the body 510 of the auxiliary input device 500 may have a substantially rectangular parallelepiped shape. For example, at least a certain area of front and rear surfaces of the body 500 of the auxiliary input device 500 may have a substantially rectangular shape, and at least a corner of a border surrounding the certain area may be formed in a curved surface having a predetermined curvature. However, the shape of the body 510 is not limited thereto or thereby. The body 510 may have a cube shape, a cylinder shape, a hemi-spherical shape, or a spherical shape.

The body 510 of the auxiliary input device 500 may include an input module 530 disposed on a surface thereof. The input module 530 may include, for example, at least one of a touch pad, a trackball, a wheel key, a physical key, a physical button, a touch key, or a joystick. As shown in FIG. 5C, the input module 530 may include a first input module 531 disposed on a first surface (e.g., a front surface) of the body 510 and a second input module 533 disposed on a second surface (e.g., a rear surface) of the body 510. The input module 530 may include only one input module disposed on one surface of the body 510. The input module 530 may include a control circuit disposed therein to receive a user input (e.g., a touch input or the gesture input) and process an input signal corresponding to the user input.

According to an embodiment of the present disclosure, the body 510 may include a sensor module therein. For example, the body 510 may include at least one of a touch sensor, an acceleration sensor, a gyro sensor, and a geomagnetic field sensor disposed therein. In addition, the body 510 may further include a sensor (e.g., a pressure sensor) disposed therein to sense pressure and may include a haptic module to provide a haptic feedback. Accordingly, various effects may be provided by changing a haptic profile in accordance with a type of display being displayed. For example, in a case that an external property of an object presently displayed is a smooth object, a haptic module may receive the property of the object and set a haptic profile that is suitable for a smooth property, and thus a smooth surface may be provided to a user.

The extension part 550 of the auxiliary input device 500 may extend from one side surface of the body 510. The extension part 550 may have a substantially rectangular parallelepiped shape, but the shape of the extension part 550 is not limited to the rectangular parallelepiped shape. The extension part 550 may include a connection circuit line disposed therein to connect an input module or a sensor module of the body 510 to an electrical connection part of the connection part 570.

According to an embodiment of the present disclosure, the extension part 550 may be connected to the body 510 by a moving member 511. For example, the extension part 550 may be fixed to the moving member 511 at one surface (e.g., a side surface) of the body 510. The moving member 511 may move along a moving line formed in the surface of the body 510. The moving line may be, but is not limited to, a hole formed in the surface to have a predetermined length and width. Accordingly, the moving member 511 may move in a longitudinal direction of the hole without being separated from the hole.

According to an embodiment of the present disclosure, a hole may be formed in at least one direction of a vertical direction or a horizontal direction on one surface of the body 510. In a case where a hole is formed in a vertical direction of the body 510, the moving member 511 may move in a vertical direction, and thus the extension part 550 fixed to the moving member 511 may move in a vertical direction of the body 510. In addition, in a case where a hole is formed in a horizontal direction of the body 510, the moving member 511 may move in a horizontal direction, and thus the extension part 550 fixed to the moving member 511 may move in a horizontal direction of the body 510. In a case where a hole is formed in one surface of the body 510 along a horizontal direction, a hole may extend to a surface (e.g., a front surface or a rear surface) connected to one surface and may be formed in a portion of a surface connected to the one surface. Accordingly, the moving member 511 may move to a certain area of a front or rear surface from the side surface of the body 510, and in this case, the extension part 550 may be bent or folded with respect to the body 510 within a predetermined angle.

According to an embodiment of the present disclosure, the moving member 511 may further include an elastic material, such as a spring. Thus the moving member 511 may be deformed or restored due to elastic force in a case where the extension part 550 is bent or folded with respect to the body 510 within a predetermined angle.

According to an embodiment of the present disclosure, the moving member 511 may be implemented by a separate hinge module. A hinge module may have a cam or serration structure, and the extension part 550 may be rotated or folded with respect to the body 510 through the above-mentioned structure.

According to an embodiment of the present disclosure, the extension part 550 may further include a rotation member 551 therein. The rotation member 551 may allow the extension part 550 to rotate about a normal line of one surface (e.g., the side surface) of the body 510 within a predetermined angle. The rotation member 551 may be connected to the moving member 511 and integrally provided with the moving member 511. The rotation member 551 may have a substantially cylindrical shape such that the extension part 550 is smoothly rotated. However, the shape of the rotation member 551 is not limited to a cylindrical shape. As shown in FIG. 5B, a hollow may be formed in the extension part 550, and the rotation member 551 may be inserted into the hollow to prevent the rotation member 551 from being separated from the extension part 550. The rotation member 551 may be integrally formed with the extension part 550 and provided such that one end of the rotation member 551 connected to the moving member 511 is rotatable.

According to an embodiment of the present disclosure, at least one of the moving member 511 or the rotation member 551 may be omitted, and the extension part 550 may be integrally provided with the body 510.

The connection part 570 of the auxiliary input device 500 may be formed on one side surface of the extension part 550 to allow the auxiliary input device 500 to be connected to the electronic device 200. The connection part 570 may include, for example, a USB connector connected to a USB port of the electronic device 200. As shown in FIG. 5A, the auxiliary input device 500 may be connected to the electronic device 200 through a connection operation 501.

According to an embodiment of the present disclosure, the auxiliary input device 500 may be connected not only to the electronic device 200, but also to the main frame 110 of the HMD 100. The auxiliary input device 500 may be electrically connected to the main frame 110 since the connection part 570 is inserted into a USB port formed in the placing part 113 of the main frame 110.

According to an embodiment of the present disclosure, at least one component of the above-mentioned components of the auxiliary input device 500 may be omitted, or the auxiliary input device 500 may further include at least one additional component. In this case, the auxiliary input device 500 may serve as a sensing device that applies sensing information obtained through a sensor module disposed internally to the HMD 100 or the electronic device 200.

Figure 6A:
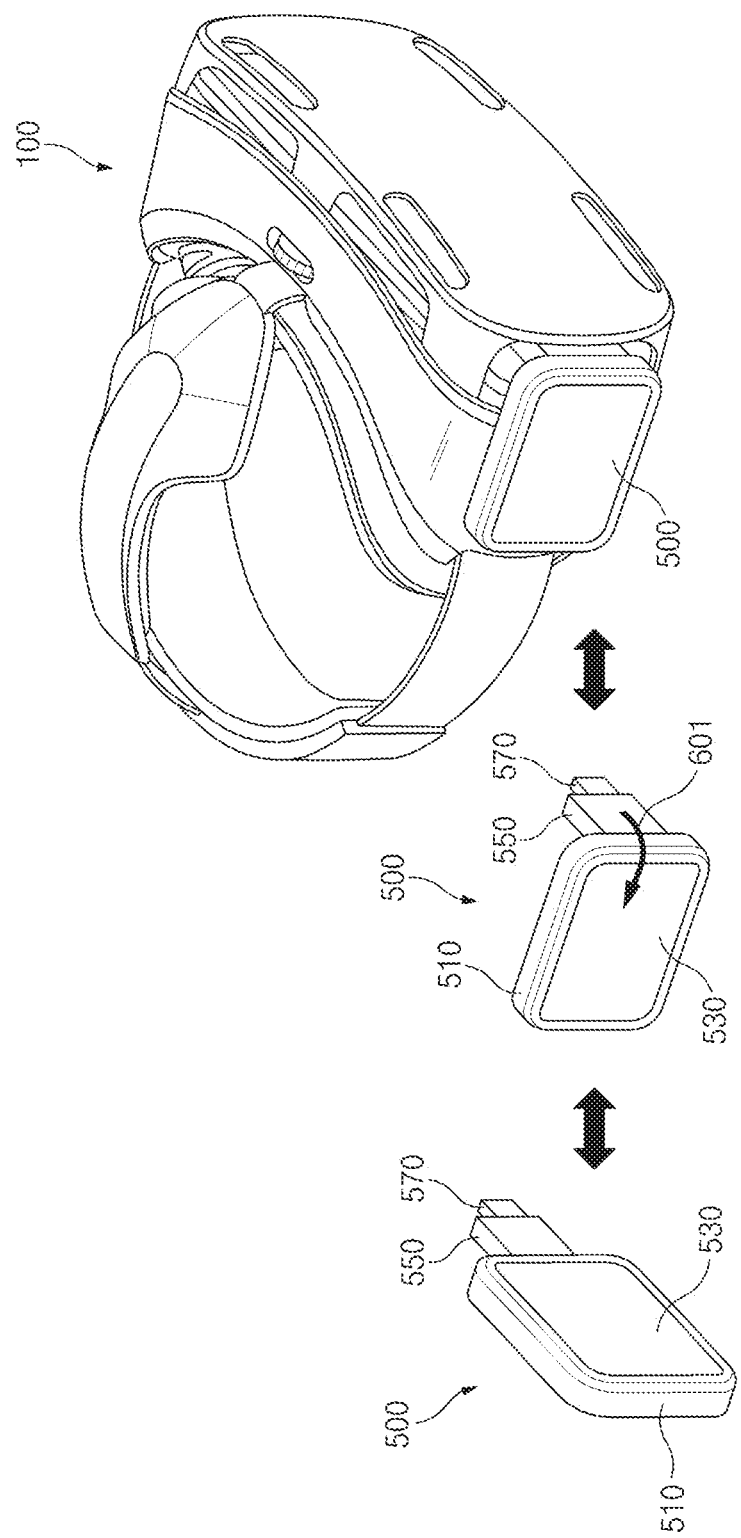
FIG. 6A is a view of an auxiliary input device that is unbent and partially bent, respectively, according to an embodiment of the present disclosure.

FIG. 6A is a view of an auxiliary input device that is unbent and partially bent, respectively, according to an embodiment of the present disclosure.

Referring to FIG. 6A, a portion of the auxiliary input device 500 may be bent within a predetermined angle. As shown in FIG. 6A, the body 510 may bent at a predetermined angle with respect to the extension part 550 by an operation that applies a force equal to or greater than a predetermined level to the body 510 or to the extension part 550 of the auxiliary input device 500 to bend the body 510.

According to an embodiment of the present disclosure, in a case where the auxiliary input device 500 is placed on the placing part 113 of the main frame 110, a direction to which the auxiliary input device 500 is bent may be a direction to which the first surface (e.g., the front surface) is exposed to the outside, e.g., a rear surface direction of the main frame 110 with respect to a normal line direction of the surface on which the placing part 113 of the main frame 110 is disposed, or a direction to which the second surface (e.g., the rear surface) is exposed to the outside, e.g., a front surface direction of the main frame 110 with respect to the normal line direction of the surface on which the placing part 113 of the main frame 110 is disposed.

According to an embodiment of the present disclosure, if a portion of the auxiliary input device 500 is bent and connected to the electronic device 200 or the main frame 110, the auxiliary input device 500 may be placed on the placing part 113 of the main frame 110. The auxiliary input device 500 may be placed on the placing part 113 after being bent while the auxiliary input device 500 is connected to the electronic device 200 or the main frame 110. For example, the input module 530 of the auxiliary input device 500 may be disposed at the side surface of the main frame 110 (hereinafter, referred to as a side surface touch mode). A user may smoothly operate the input module 530 during the side surface touch mode using his/her hands.

As shown in FIG. 6A, if the auxiliary input device 500 is bent and the first surface is exposed to the outside, the user input may be received through the input module 530 (e.g., the first input module 531) formed on the first surface. In addition, the sensor module disposed in the auxiliary input device 500 may set a state in which a portion of the auxiliary input device 500 is bent to an initial state of a six-axis motion sensing operation, and thus a sensor module may collect information on the movement of the head of a user.

FIG. 6A show an acute angle (or an angle exceeding zero degrees but less than 90 degrees) or a right angle (or an angle of 90 degrees) as the angle at which a portion of the auxiliary input device 500 is bent, but the present disclosure is not limited thereto or thereby. According to an embodiment of the present disclosure, an angle at which a portion of the auxiliary input device 500 is bent may be an obtuse angle (or an angle exceeding 90 degrees but less than 180 degrees) or a straight angle (or an angle of 180 degrees). Hereinafter, a state in which a portion of the auxiliary input device 500 is bent at an obtuse angle with reference to an embodiment of the present disclosure is described below.

Figure 6B:
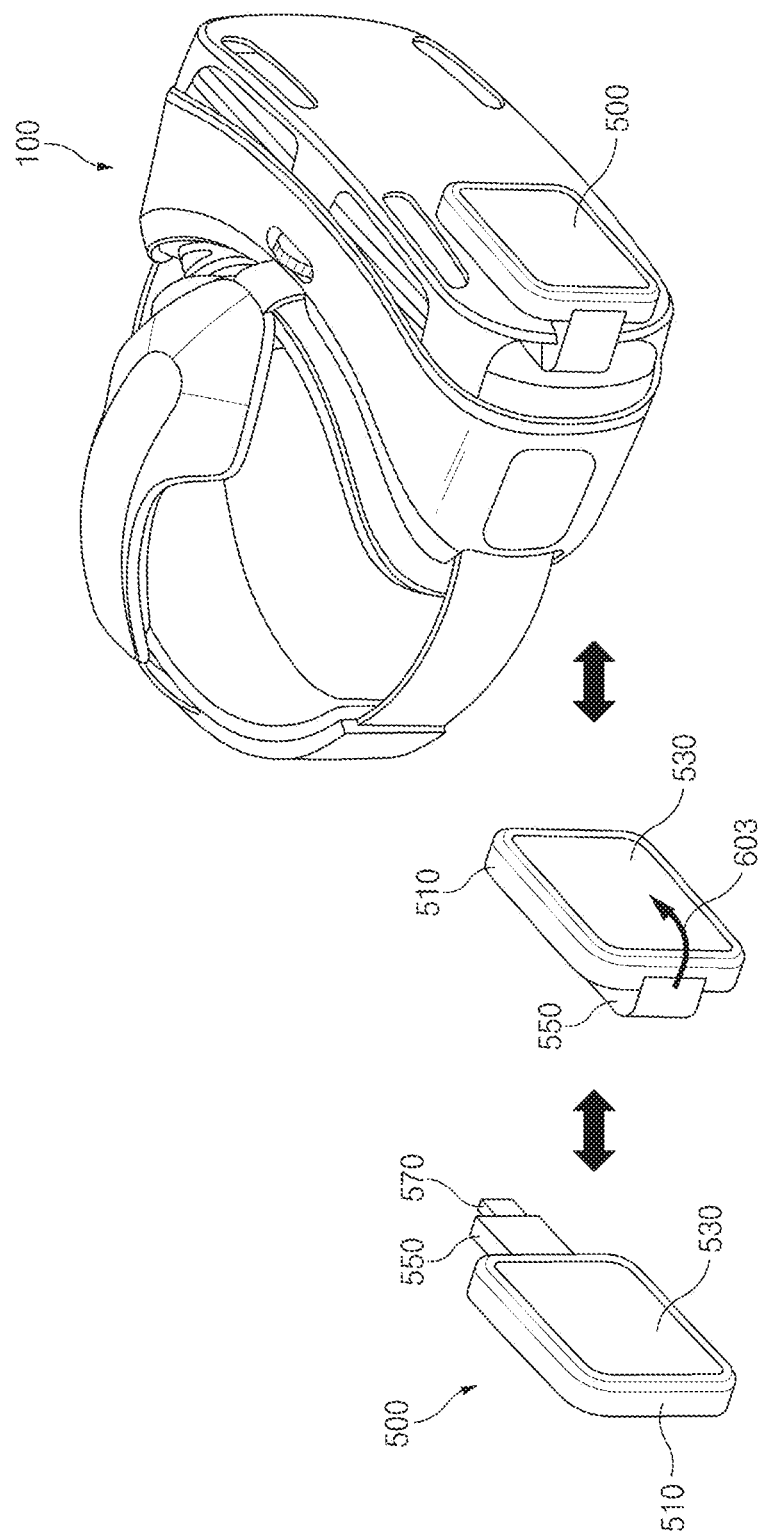
FIG. 6B is a view of an auxiliary input device unfolded and partially folded, respectively, according to an embodiment of the present disclosure.

FIG. 6B is a view of an auxiliary input device unfolded and partially folded, respectively, according to an embodiment of the present disclosure.

Referring to FIG. 6B, a direction in which a portion of the auxiliary input device 500 is bent may be an obtuse angle. For example, the operation 601 shown in FIG. 6A may be followed by an operation 603 that folds a portion of the auxiliary input device 500 if a force greater than or equal to a predetermined force is applied to the portion of the auxiliary input device 500 during a predetermined time period. The auxiliary input device 500 may be folded through the folding operation 603 to allow the first surface or the second surface of the body 510 to face one surface of the extension part 550.

According to an embodiment of the present disclosure, in a state in which a portion of the auxiliary input device 500 is folded, the body 510 of the auxiliary input device 500 may be placed in the front surface direction of the main frame 110 instead of being placed on the placing part 113 of the main frame 110. For example, the input module 530 of the auxiliary input device 500 may be placed at the front surface of the main frame 110 (hereinafter, referred to as a front surface touch mode). Since the touch surface of the input module 530 is the same as the display surface seen through the HMD 100, the user may have a more user-intuitive experience.

As shown in FIG. 6B, if the auxiliary input device 500 is folded and the first surface is exposed to the outside, a user input may be received through the input module 530 (e.g., the first input module 531) disposed on the first surface. In addition, a sensor module disposed in the auxiliary input device 500 may set a state in which a portion of the auxiliary input device 500 is folded to an initial state of a six-axis motion sensing operation, and thus the sensor module may collect information on the movement of the head of a user.

Figure 6C:
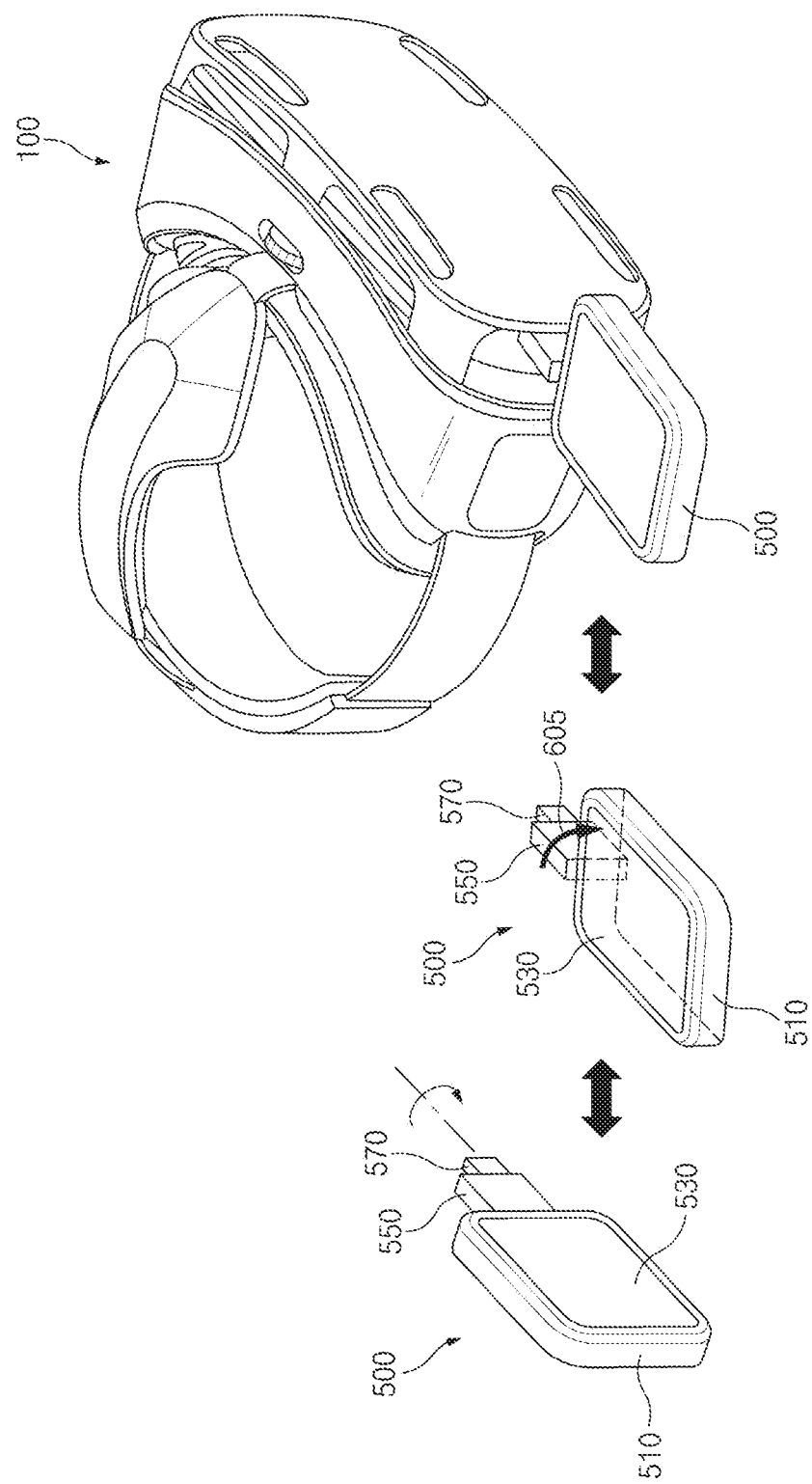
FIG. 6C is a view of an auxiliary input device not rotated and partially rotated, respectively, according to an embodiment of the present disclosure.

FIG. 6C is a view of an auxiliary input device not rotated and partially rotated, respectively, according to an embodiment of the present disclosure.

Referring to FIG. 6C, a portion of the auxiliary input device 500 may be rotated. As shown in FIG. 6C, the body 510 may be rotated with respect to a rotation axis of a normal line direction of a surface (e.g., a side surface) in which the extension part 550 is connected within a predetermined angle by an operation 605 that applies a force greater than or equal to a predetermined force to the body 510 or the extension part 550 of the auxiliary input device 500. In FIG. 6C, the rotation angle may be a right angle, but the present disclosure is not limited thereto or thereby. According to an embodiment of the present disclosure, a portion of the auxiliary input device 500 may be rotated within an angle (e.g., −360 degrees (or one turn in a counter-clockwise direction) to +360 degrees (or one turn in a clockwise direction)) in which the connection circuit line disposed in the extension part 550 would not be damaged.

According to an embodiment of the present disclosure, in the state in which a portion of the auxiliary input device 500 is rotated, the first and second surfaces of the body 510 of the auxiliary input device 500 may be exposed to the outside. Accordingly, a user may use the first input module 531 disposed on the first surface and the second input module 533 disposed on the second surface.

According to an embodiment of the present disclosure, the input module 530 of the auxiliary input device 500 may be provided in various shapes. For example, the input module 530 of the auxiliary input device 500 may include at least one of a touch pad, a trackball, a wheel key, a physical key, a physical button, a touch key, or a joystick.

Figure 7A:
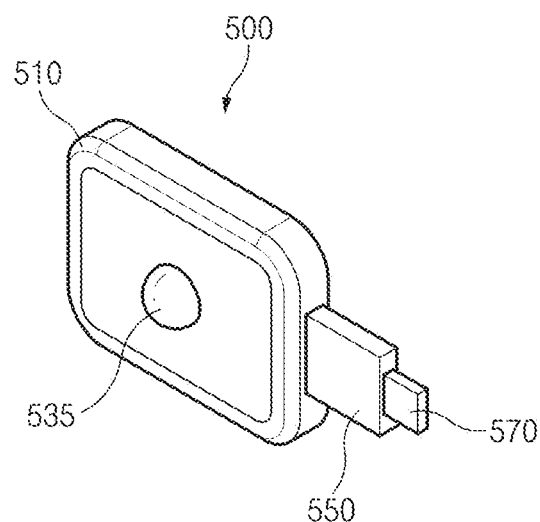
FIG. 7A is a perspective view of an auxiliary input device including a trackball according to an embodiment of the present disclosure.
Figure 7B:
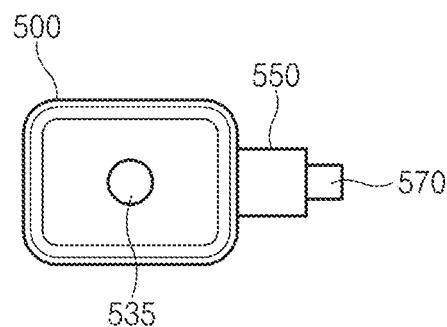
FIG. 7B is a front view of an auxiliary input device including a trackball according to an embodiment of the present disclosure.
Figure 7C:
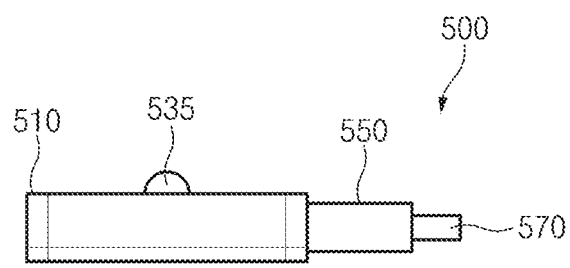
FIG. 7C is a side view of an auxiliary input device including a trackball according to an embodiment of the present disclosure.

FIGS. 7A to 7C are views of an input module of the auxiliary input device 500, which is configured to include a trackball 535. FIG. 7A is a perspective view of the auxiliary input device 500 including the trackball 535, FIG. 7B is a front view of the auxiliary input device 500 including a trackball, and FIG. 7C is a side view of the auxiliary input device 500 including the trackball 535.

Referring to FIGS. 7A to 7C, the input module 530 disposed on one surface of the body 510 of the auxiliary input device 500 may include the trackball 535. According to an embodiment of the present disclosure, the trackball 535 may be disposed in an area (e.g., a center area) of the input module 530. FIGS. 7A to 7C show only one trackball 535 disposed in the input module 530, but the number of the trackballs 535 is not limited to one. A plurality of trackballs 535 may be disposed on one surface of the body 510, and one or more trackballs 535 may be disposed on a first surface (e.g., a front surface) and a second surface (e.g., a rear surface) of the body 510.

A user may roll an input part having a spherical shape of the trackball 535 using his/her fingers or other parts of his/her body to move a cursor to a desired position or to move a screen. In addition, a user may select an object displayed on a screen or execute a predetermined function by pushing an input part having a spherical shape, pushing a button disposed adjacent to an input part having a spherical shape, or a touch pad of the input module 530. According to an embodiment of the present disclosure, if an input operation is performed by using the trackball 535, a movement may be more precisely controlled, and the movement may be controlled in a wide range as compared to a touch pad in which a movement is structurally restricted.

Figure 8A:
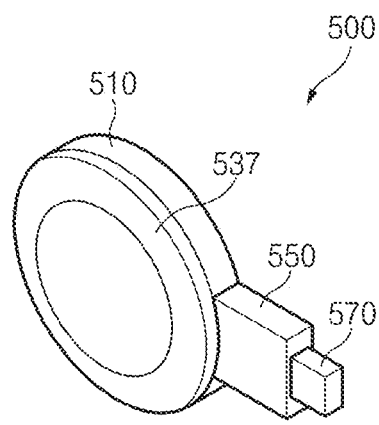
FIG. 8A is a perspective view of an auxiliary input device including a wheel key according to an embodiment of the present disclosure.
Figure 8B:
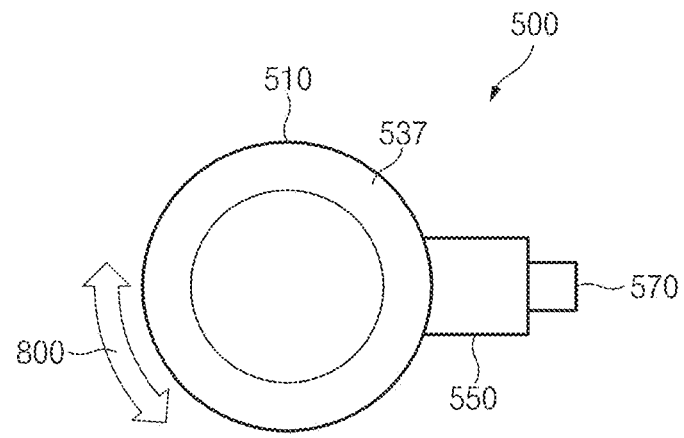
FIG. 8B is a front view of an auxiliary input device including a wheel key according to an embodiment of the present disclosure.
Figure 8C:
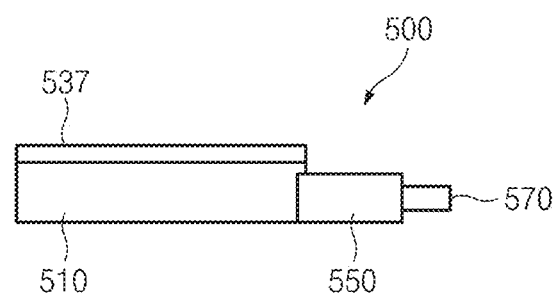
FIG. 8C is a side view of an auxiliary input device including a wheel key according to an embodiment of the present disclosure.

FIGS. 8A to 8C are views of an input module of the auxiliary input device 500, which is configured to include a wheel key 537. FIG. 8A is a perspective view of the auxiliary input device 500 including the wheel key 537, FIG. 8B is a front view of the auxiliary input device 500 including the wheel key 537, and FIG. 8C is a side view of the auxiliary input device 500 including the wheel key 537.

Referring to FIGS. 8A to 8C, the input module 530 disposed on one surface of the body 510 of the auxiliary input device 500 may include the wheel key 537. According to an embodiment of the present disclosure, the wheel key 537 may be disposed in an area (e.g., an edge area) of the input module 530. In a case where the auxiliary input device 500 includes the wheel key 537, the body 510 may have approximately the same or similar shape as or to the shape (e.g., a circular shape) of the wheel key 537. For example, the body 510 may have a substantially cylindrical shape. In addition, the input module 530 configured with the wheel key 537 may be disposed in an edge area of one surface of the body 510 having a cylindrical shape.

FIGS. 8A to 8C show only one wheel key 537 disposed on one surface of the body 510, but the present disclosure is not limited thereto or thereby. According to an embodiment of the present disclosure, one or more wheel keys 537 may be disposed on a first surface (e.g., a front surface) and a second surface (e.g., a rear surface) of the body 510.

A user may roll an input part having a circular shape of the wheel key 537 using his/her fingers or other parts of his/her body to move a screen or to execute a scroll operation (800). In addition, a user may select an object displayed on a screen or execute a predetermined function by pushing the wheel key 537 or pushing a touch pad of the input module 530 disposed adjacent to the wheel key 537 (e.g., disposed in the wheel key 537). Similar to the trackball 535, the wheel key 537 may allow a movement to be more precisely controlled and allow a movement to be controlled in a wide range as compared to a touch pad in which a movement is structurally restricted.

Figure 9:
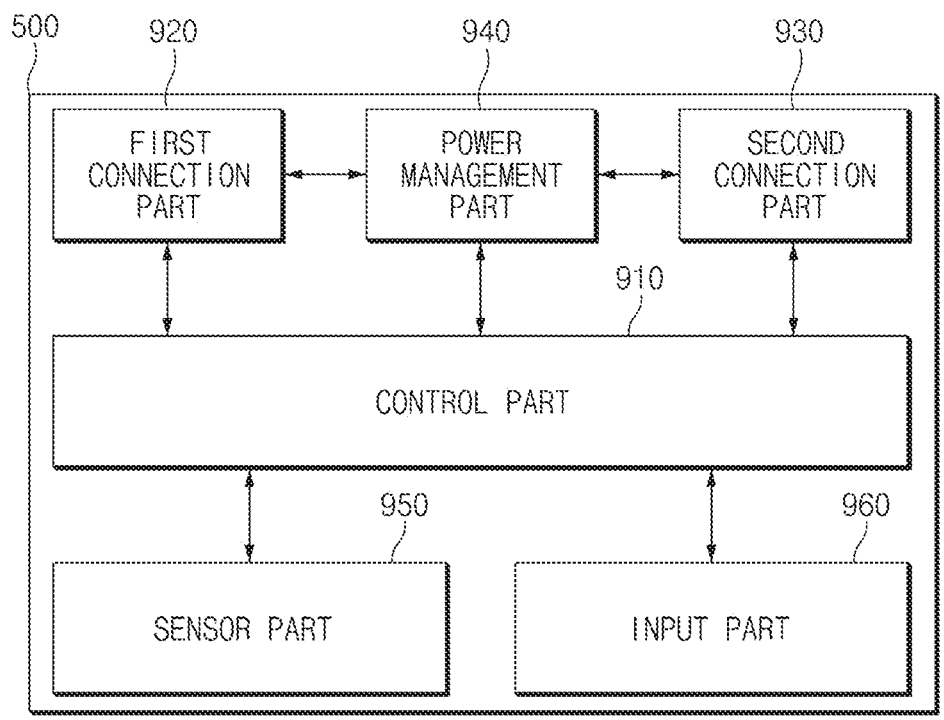
FIG. 9 is a block diagram of an auxiliary input device according to an embodiment of the present disclosure.

FIG. 9 is a block diagram of an auxiliary input device 500 according to an embodiment of the present disclosure.

Referring to FIG. 9, the auxiliary input device 500 may include a control part 910 (or a control circuit), a first connection part 920, a second connection part 930, a power management part 940, a sensor part 950 (or a sensor module), and an input part 960 (or an input module).

The control part 910 may include one or more of a central processing unit (CPU), an application processor (AP), or a communication processor (CP). The control part 910 may control a function of controlling at least one component of the auxiliary input device 500 and/or calculating or processing data of a communication.

According to an embodiment of the present disclosure, the control part 910 may apply a connection signal to the electronic device 200 or the HMD 100 if the auxiliary input device 500 is connected to the electronic device 200 or the main frame 110 of the HMD 100. The electronic device 200 may provide a function selection interface to a screen of the electronic device 200 in response to a connection signal.

According to an embodiment of the present disclosure, the control part 910 may apply information obtained based on the sensor part 950 or the input part 960 to the electronic device 200 or the HMD 100. For example, the controller 910 may apply information (e.g., head-tracking) obtained in response to the movement of the head of a user or information (e.g., touch information) obtained in response to a user input.

The first connection part 920 may provide an interface to connect the auxiliary input device 500 to the electronic device 200 or the main frame 110 of the HMD 100. The first connection part 920 may include, for example, hardware devices, such as a plug or a connector, which allow devices to be connected to each other, and a connection circuit used to communicate between devices, e.g., a data transmission. For example, the first connection part 920 may include a high definition multimedia interface (HDMI), a USB, a connector in accordance with recommended standard 232 (RS-232), an optical interface, or a D-subminiature (D-sub) connector.

The second connection part 930 may provide an interface to receive power from an external power source. The second connection part 930 may have the same or similar configuration as or to the first connection part 920. For example, the second connection part 930 may include an HDMI, a USB, a RS-232 connector, an optical interface, or a D-sub connector.

The power management part 940 may manage power of the auxiliary input device 500. According to an embodiment of the present disclosure, the power management part 940 may include a power management integrated circuit (PMIC), a charger integrated circuit (charger IC), or a battery gauge. The PMIC may have a wired and/or wireless recharging scheme. The wireless charging scheme may include, for example, a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of a battery, a voltage, a current, or a temperature while a battery is being charged. A battery may include, e.g., a rechargeable battery and/or a solar battery.

According to an embodiment of the present disclosure, if the auxiliary input device 500 is connected to an external power source through the second connection part 930, the power management part 940 may provide power to the auxiliary input device 500 and substantially simultaneously charge the electronic device 200 or the HMD 100 connected to the auxiliary input device 500. If the auxiliary input device 500 is connected to the external power source, the power management part 940 may directly charge the electronic device 200 or the HMD connected to the auxiliary input device 500 without providing power to the auxiliary input device 500.

The sensor part 950 may measure a physical quantity or sense an operation status of the auxiliary input device 500 and convert the measured or sensed information to an electrical signal. The sensor part 950 may include, for example, an acceleration sensor, a gyro sensor, or a geomagnetic field sensor, but the present disclosure is not limited thereto or thereby.

According to an embodiment of the present disclosure, when the auxiliary input device 500 is connected to the HMD 100 or the electronic device 200 connected to the HMD 100, the sensor part 950 may sense the movement of the head of a user wearing the HMD 100. For example, the sensor part 950 may sense a rotation of the head (e.g., a left-and-right rotation or an up-and-down rotation) or a movement in a position of the head to measure a position of the head, a moving distance, a moving speed, a rotation distance, or a rotation speed.

The input part 960 may receive a user input, e.g., a touch input, a gesture input, or a hovering input. The input part 960 may include at least one of a touch pad, a trackball, a wheel key, a physical key, a physical button, a touch key, or a joystick. In addition, the input part 960 may further include a control circuit to control the above-mentioned input device or to process an input signal. A touch pad may recognize a touch input by using at least one of a capacitive method, a resistive method, an infrared method and an ultrasonic detecting method. A capacitive type touch pad may recognize a physical contact or a proximity touch. A touch pad may further include a tactile layer to provide a tactile reaction to a user.

The configuration of the auxiliary input device 500 is not limited thereto or thereby the configurations described above. According to an embodiment of the present disclosure, at least one component of the above-mentioned components may be omitted, or an additional component may be added to the auxiliary input device 500. For example, the auxiliary input device 500 may further include a communication module (or a wired/wireless communication circuit). A communication module may provide an interface for the wired communication or the wireless communication with the electronic device 200, the HMD 100, or an external electronic device. A communication module may provide an interface for at least one format of, for example, long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), or the like. Furthermore, a communication module may provide an interface for a local area network including at least one of wireless fidelity (WiFi), Bluetooth, near field communication (NFC), magnetic stripe transmission (MST), or global navigation satellite system (GNSS).

As described above, according to an embodiment of the present disclosure, a kit for a head-mounted system may include a head-mounted display device worn on a head of a user and configured to include a main frame coupled to an electronic device and a support part fixing the main frame to a facial side of the user, and an auxiliary input device configured to include a body, an input module disposed on at least one surface of the body and processing an input signal for controlling a function of the electronic device, a sensor module disposed in the body and obtaining sensing information in accordance with a movement of the auxiliary input device, and a connection part electrically connected to the electronic device to serve as a path through which the input signal and the sensing information are transmitted to the electronic device.

According to an embodiment of the present disclosure, a sensor module may include at least one of an acceleration sensor, a gyro sensor, and a geomagnetic field sensor.

According to an embodiment of the present disclosure, an input module may include at least one of a touch pad, a trackball, and a wheel key.

According to an embodiment of the present disclosure, the auxiliary input device may further include a communication module, where the communication module may transmits at least one of an input signal and sensing information to an electronic device in a wireless manner.

According to an embodiment of the present disclosure, the auxiliary input device may further include an extension part disposed between a body and a connection part, and the extension part may be fixed to a moving member formed in one surface of the body to allow the extension part to move.

According to an embodiment of the present disclosure, a moving member may be inserted into a hole formed in one surface of a body, where the hole has a length and a width, and where one end of the moving member may be inserted into the hole such that the moving member is affixed to the hole.

According to an embodiment of the present disclosure, a hole may be formed in at least one of a vertical direction and a horizontal direction on one surface of a body, where the hole has a length.

According to an embodiment of the present disclosure, a hole may extend to another surface connected to one surface of a body and may be formed in a portion of the other surface connected to the one surface, and the moving member may move to the extension portion of the hole such that an extension part is bent or folded with respect to the body within an angle.

According to an embodiment of the present disclosure, a moving member may include an elastic material as at least a portion thereof, and the moving member may be deformed or restored due to an elastic force in a case where an extension part is bent or folded with respect to a body within an angle.

According to an embodiment of the present disclosure, an extension part may further include a rotation member therein, and the rotation member may allow the extension part to rotate about a normal line of one surface of a body within an angle.

According to an embodiment of the present disclosure, a rotation member may be inserted into a hollow formed in an extension part such that the rotation member is affixed to the extension part.

According to an embodiment of the present disclosure, a connection part may be connected to one surface of a main frame and electrically connected to an electronic device through an electrical connection part disposed on the main frame if the electronic device is installed at the main frame.

As described above, according to an embodiment of the present disclosure, a kit for a head-mounted system may include a head-mounted display device worn on a head of a user that is configured to include a frame structure at which a mobile electronic device is installed, a support member for fixing the frame structure to the head of the user, and a sensing device configured to include a housing, a wired and/or wireless communication circuit included in the housing, at least one sensor included in the housing, and a control circuit electrically connected to the communication circuit and the at least one sensor. The control circuit may be configured to obtain information associated with a movement of the sensing device using the at least one sensor, and to transmit the obtained information to the mobile electronic device using the communication circuit.

According to an embodiment of the present disclosure, at least one touch sensor may include at least one of a touch pad, a trackball, and a wheel key.

According to an embodiment of the present disclosure a sensing device may further include a connector (or connection part) disposed on at least a portion of a housing and electrically connected to a control circuit, where the control circuit may be configured to transmit obtained information to a mobile electronic device through the connector.

According to an embodiment of the present disclosure, a control circuit may be configured to transmit obtained information to a mobile electronic device using a communication circuit.

As describe above, according to an embodiment of the present disclosure, an electronic device (or a sensing device) detachably attached to a mobile electronic device to provide a signal may include a housing including a first surface and a second surface facing an opposite side of the first surface, at least one touch sensor disposed on the first surface and/or the second surface of the housing, at least one sensor disposed in the housing, a communication circuit disposed in the housing, and a control circuit electrically connected to the at least one touch sensor, the at least one sensor, and the communication circuit. The communication circuit may be configured to obtain a gesture or touch input from a user using the at least one touch sensor, obtain information associated with an orientation and/or a movement of the electronic device using the at least one sensor, and transmit the obtained input and information to the mobile electronic device using the communication circuit.

As describe above, according to an embodiment of the present disclosure, a mobile electronic device detachably attached to a head-mounted display device worn on a head of a user may include a communication circuit, a display, a processor electrically connected to the communication circuit and the display, and a memory electrically connected to the processor. The memory may store instructions, when executed by the processor, causing the processor to receive at least one input signal from an external sensing device using the communication circuit, display content associated with the head-mounted display device through at least a portion of the display based on at least a portion of the obtained at least one input signal, receive information on an orientation and/or a movement of the external sensing device, which are obtained by the external sensing device, from the external sensing device, and to change the content displayed on the display based on the received information.

Figure 10:
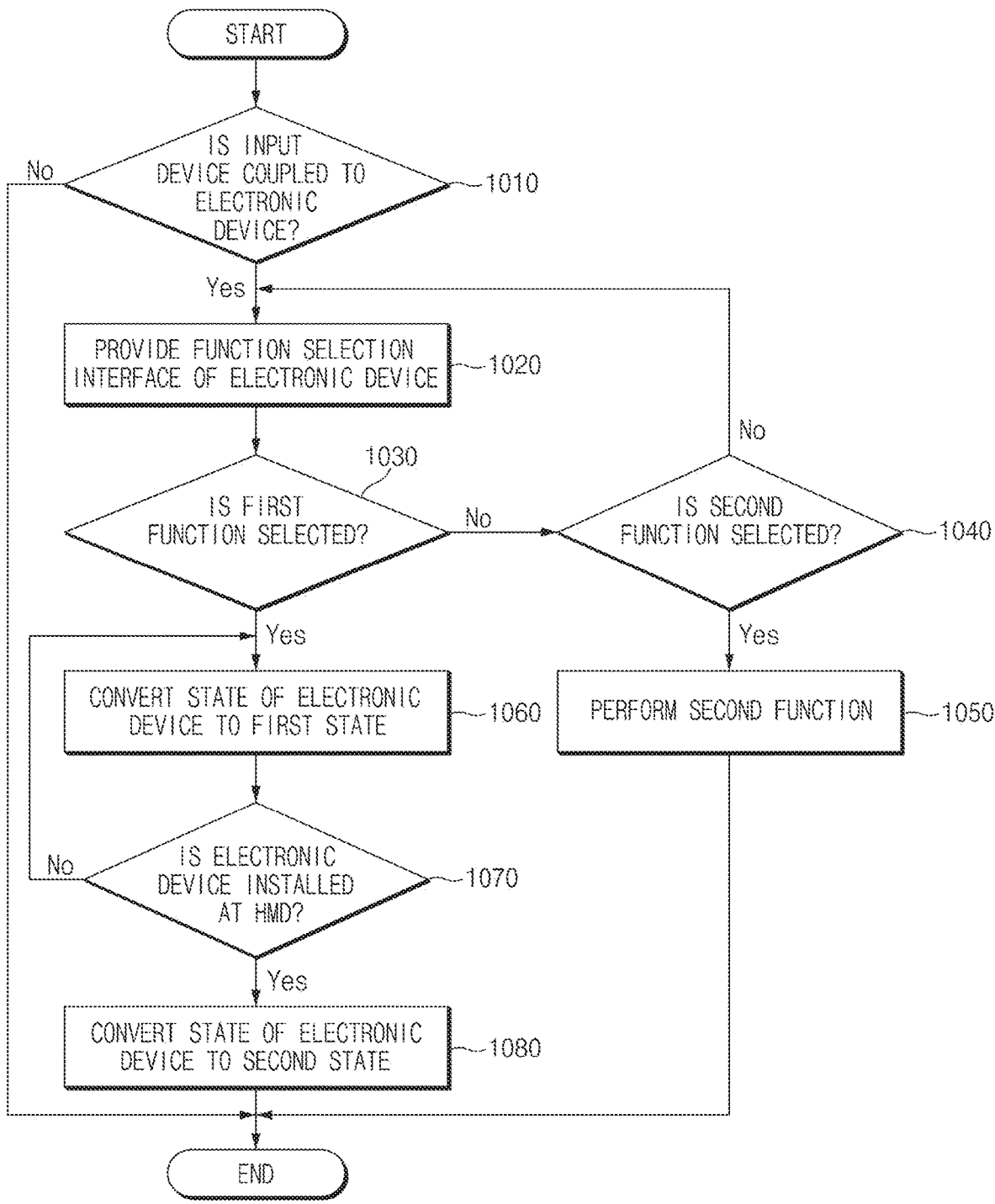
FIG. 10 is a flowchart of a method of operating an electronic device associated with a coupling of an auxiliary input device according to an embodiment of the present disclosure.

FIG. 10 is a flowchart of a method of operating an electronic device associated with a coupling of an auxiliary input device according to an embodiment of the present disclosure.

Referring to FIG. 10, the electronic device 200 may determine whether the auxiliary input device 500 is coupled to an electronic device in operation 1010. According to an embodiment of the present disclosure, the auxiliary input device 500 may apply a connection signal to the electronic device 200 when the auxiliary input device 500 is connected to the electronic device 200. The electronic device 200 may support a plug and play function, and, thus, a system may automatically sense the connection of the auxiliary input device 500.

According to an embodiment of the present disclosure, in a case where the auxiliary input device 500 is not connected to the electronic device 200, the electronic device 200 may not execute the operations (e.g., operation 1020 to operation 1080) described below. In a case where the auxiliary input device 500 is connected to the electronic device 200, the electronic device 200 may provide a function selection interface of the electronic device 200 in operation 1020. The electronic device 200 may output a screen through which a function of the electronic device 200 may be selected.

According to an embodiment of the present disclosure, a function selection interface of the electronic device 200 may include a display object (e.g., a button object) used to select a first function (e.g., a Gear VR® function) and a second function (e.g., an electronic device function).

In operation 1030, the electronic device 200 may determine whether a first function is selected. According to an embodiment of the present disclosure, in a case where the first function is not selected, the electronic device 200 may determine whether a second function is selected in operation 1040. In a case where the second function is not selected, the electronic device 200 may return to operation 1020 and may wait until a user selects the first function or the second function. In a case where a predetermined time lapses while a user does not select any one of the first and second functions, the electronic device 200 may recognize that one of the first function or the second function is selected. The electronic device 200 may stop outputting a screen and enter a reduced power (or sleep) mode.

According to an embodiment of the present disclosure, when the second function is selected, the electronic device 200 may perform the second function in operation 1050. The second function may include a general function (e.g., a call function, a message function, a multimedia file execution function, a camera function, or the like) of the electronic device 200. If the second function is selected, the electronic device 200 may prepare the auxiliary input device 500 to be used as an auxiliary input tool with an input device included in the electronic device 200.

According to an embodiment of the present disclosure, if the first function is selected, in operation 1060, the electronic device 200 may convert the state of the electronic device 200 to a first state to perform the first function. The first function may include a VR function of the electronic device 200 in association with the use of the HMD 100. In addition, the first state (e.g., a plug-in mode) may include a state where the electronic device 200 may rapidly perform an application for the VR. If the state of the electronic device 200 is converted to the first state, the electronic device 200 may prepare an application for the VR to be executed. For example, the electronic device 200 may output a separate mono image on the screen thereof and drive the application for the VR as its background.

In operation 1070, the electronic device 200 may determine whether the electronic device 200 is installed on the HMD 100. According to an embodiment of the present disclosure, the HMD 100 may further include a sensor (e.g., a proximity sensor) arranged in an area of the front case 117 of the main frame 110 to sense whether the electronic device 200 is installed at the HMD 100 or the HMD 100 is worn on the head of a user. In this case, when the electronic device 200 is coupled to the HMD 100, the HMD 100 may apply a coupling signal to the electronic device 200, and the electronic device 200 may determine whether the electronic device 200 is installed at the HMD 100 in response to the coupling signal. The electronic device 200 may support a plug and play function, and, thus, the system may automatically sense a connection of the electronic device 200 when the electronic device 200 is connected to the connector disposed on the main frame 110 of the HMD 100.

According to an embodiment of the present disclosure, in a case where the electronic device 200 is not installed at the HMD 100 or the HMD 100 is not worn on the head of a user, the electronic device 200 may return to operation 1060 and wait until the electronic device 200 is installed at the HMD 100 or the HMD 100 is worn on the head of a user. In a case where a predetermined time elapses while the electronic device 200 is not installed at the HMD 100, the electronic device 200 may stop outputting a screen and enter into a sleep mode.

According to an embodiment of the present disclosure, in a case where the electronic device 200 is installed at the HMD 100 or the HMD 100 is worn on the head of a user, a state of the electronic device 200 may be converted to a second state (e.g., a mount mode) in operation 1080. If the state of the electronic device 200 is converted to the second state, the electronic device 200 may stop outputting a screen that is displayed and may output an execution screen of an application for VR.

According to an embodiment of the present disclosure, a state of the electronic device 200 may not be converted to the second state even though the electronic device 200 is installed at the HMD 100. For example, if the electronic device 200 is installed at the HMD 100, the state of the electronic device 200 may not be converted to the second state if a user is not wearing the HMD 100 on his/her head. If the HMD 100 is worn on the head of a user, the electronic device 200 may convert the state of the electronic device 200 to the second state in operation 1080. In this regard, it may be determined whether the HMD 100 is worn on the head of a user by using a sensor included in the main frame 110 of the HMD 100 or the electronic device 200. For example, when a proximity sensor is installed in the main frame 110, it may be determined whether a user puts on the HMD 100 by recognizing the approach of the face of the user to the HMD 100 through the proximity sensor. An iris-recognition sensor may be installed in the main frame 110, and, in this case, it may be determined whether the HMD 100 is worn on the head of a user by identifying an iris of the user through the iris-recognition sensor when the user wears the HMD 100.

According to an embodiment of the present disclosure, an order in which the auxiliary input device 500 is coupled to the electronic device 200 and the electronic device 200 is coupled to the HMD 100 is not limited to a certain order. In addition, the order of the above-mentioned operations may be variously modified or several operations may be omitted. For example, the auxiliary input device 500 may be coupled to the electronic device 200 after the HMD 100 is coupled to the electronic device 200. In this case, the electronic device 200 may perform operation 1080 with priority to display an execution screen of an application for VR on a screen thereof. However, since the auxiliary input device 500 is not connected to the electronic device 200, some functions of the application for VR may not be performed. For example, the movement of the head of a user may be sensed by the sensor included in the electronic device 200, but a touch input may not be received since the input module exposed to the outside may not exist. If the electronic device 200 is coupled to the HMD 100 and the auxiliary input electronic device 500 is coupled to the electronic device 200, a user input may be received, and all functions of the application for VR may be performed. In a case where the auxiliary input device 500 is coupled to the electronic device 200 after the electronic device 200 is coupled to the HMD 100, operations 1010 to 1070 may be omitted.

According to an embodiment of the present disclosure, the auxiliary input device 500 may be coupled to the main frame 110 instead of being coupled to the electronic device 200. In this case, the order of the above-mentioned operations may be variously modified or several operations may be omitted. For example, in a case where the auxiliary input device 500 is coupled to the main frame 110 of the HMD 100 after the electronic device 200 is coupled to the HMD 100, the same or similar operations as or to the operations when the auxiliary input device 500 is coupled to the electronic device 200 after the electronic device 200 is coupled to the HMD 100 may be performed. However, in a case where the electronic device 200 is coupled to the HMD 100 after the auxiliary input device 500 is coupled to the main frame 110 of the HMD 100, the above-mentioned operations (e.g., operation 1010 to operation 1080) may be sequentially performed. In this case, a button object displayed on a screen of the electronic device 200 may be selected by using the input module 530 of the auxiliary input device 500 instead of touching the screen of the electronic device 200 in the function selection interface of the electronic device 200 provided in operation 1020.

According to an embodiment of the present disclosure, in a case where the auxiliary input device 500 is separated from the main frame 110 of the HMD 100, the auxiliary input device 500 may automatically form a pairing with the electronic device 200 coupled to the HMD 100 and serve as a remote input device of the electronic device 200. In a case where the auxiliary input device 500 is separated from the electronic device 200 while the electronic device 200 is coupled to the HMD 100 and the auxiliary input device 200 is connected to the electronic device 500, the auxiliary input device 500 may automatically form a pairing with the electronic device 200 and serve as a remote input device. Then, in a case where the auxiliary input device 500 is coupled to the main frame 110 of the HMD 100 again, a pairing between the auxiliary input device 500 and the electronic device 200 may be automatically disabled.

Figure 11:
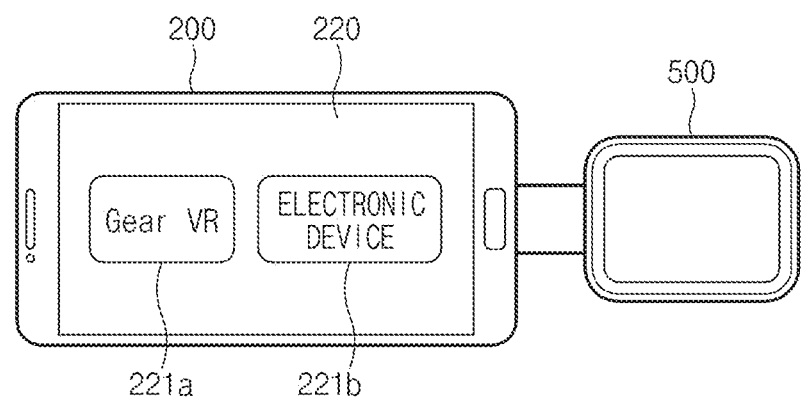
FIG. 11 is an illustration of a function selecting interface of an electronic device, which is provided if an auxiliary input device is coupled to the electronic device according to an embodiment of the present disclosure.

FIG. 11 is an illustration of a function selecting interface of the electronic device, which is provided when the auxiliary input device is coupled to the electronic device according to an embodiment of the present disclosure.

Referring to FIG. 11, if the auxiliary input device 500 is coupled to the electronic device 200, the electronic device 200 may provide an interface on a display 220 to select a function of the electronic device 200. According to an embodiment of the present disclosure, the electronic device 200 may display a display object (e.g., a first button object 221*a* and a second button object 221*b*) through the display 220 to select a first function (e.g., a Gear VR® function) and a second function (e.g., an electronic device function) of the electronic device 200.

According to an embodiment of the present disclosure, if the first button object 221*a* is selected, the electronic device 200 may be switched to a first state (e.g., a plug-in mode) to perform a first function. For example, the electronic device 200 may drive an application for VR as a background to rapidly perform the application for VR. The electronic device 200 may secure a memory space required to drive the application for VR and load resources of the application for VR into the memory instead of driving the application for VR. If the first button object 221*a* is selected, the electronic device 200 may stop outputting the function selection interface to return to a screen before an output of a function selection interface or may not display a separate mono image.

According to an embodiment of the present disclosure, if the second button object 221*b* is selected, the electronic device 200 may perform a second function. The electronic device 200 may stop outputting the function selection interface and return to a screen before the screen that outputs the function selection interface to general functions of the electronic device 200.

Figure 12A:
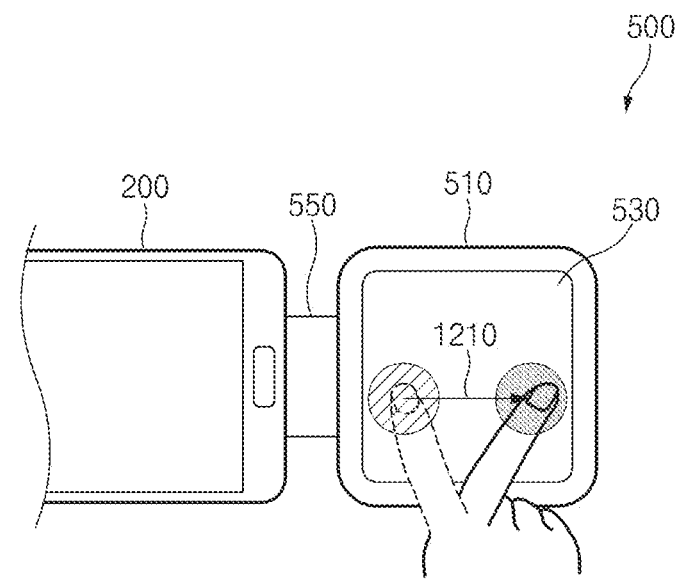
FIG. 12A is an illustration of a first input function performed through an auxiliary input device according to an embodiment of the present disclosure.
Figure 12B:
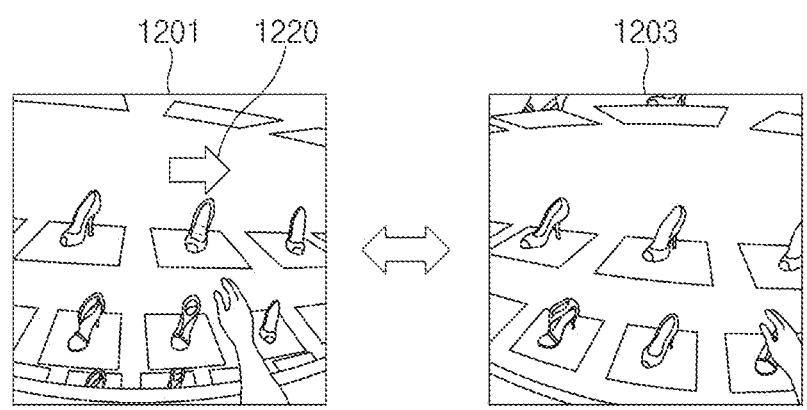
FIG. 12B is an illustration of a screen provided in accordance with the first input function of FIG. 12A according to an embodiment of the present disclosure.
Figure 12C:
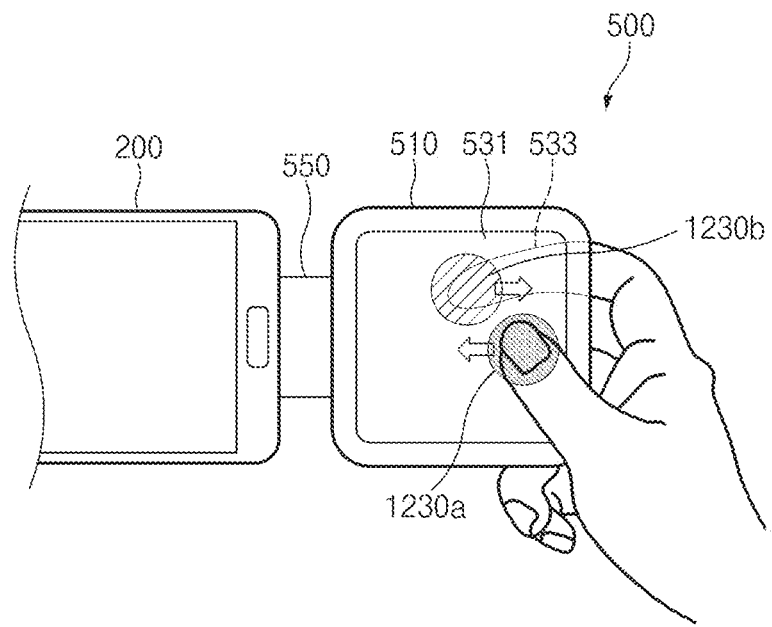
FIG. 12C is an illustration of a second input function performed through an auxiliary input device according to an embodiment of the present disclosure.
Figure 12D:
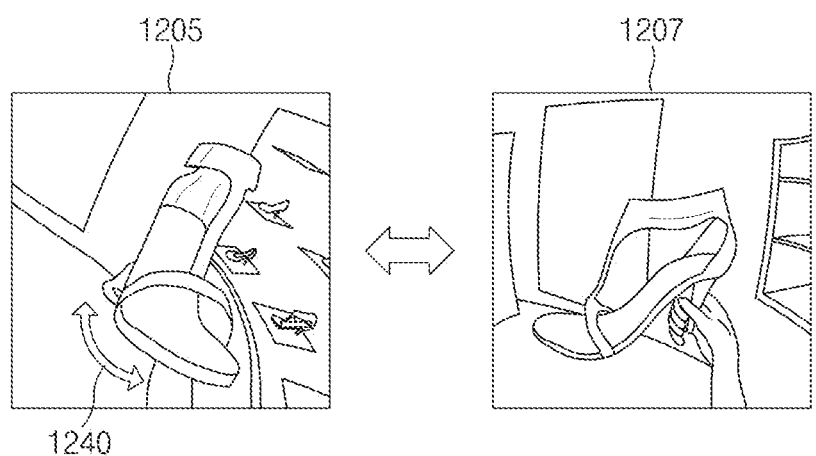
FIG. 12D is an illustration of a screen provided in accordance with the second input function of FIG. 12C according to an embodiment of the present disclosure.

FIG. 12A is an illustration of a first input function performed through an auxiliary input device according to an embodiment of the present disclosure, FIG. 12B is an illustration of a screen provided in accordance with the first input function of FIG. 12A according to an embodiment of the present disclosure, FIG. 12C is an illustration of a second input function performed through an auxiliary input device according to an embodiment of the present disclosure, and FIG. 12D is an illustration of a screen provided in accordance with the second input function of FIG. 12C according to an embodiment of the present disclosure.

According to an embodiment of the present disclosure, the HMD 100 may provide a user with various experiences using an input function of the auxiliary input device 500. An input function of the auxiliary input device 500 may include object selection, movement of an object, rotation of an object, movement of a screen, rotation of a screen, screen zoom in/out, or screen scroll. FIGS. 12A to 12B show a first input function associated with the movement of an object or the movement of a screen, and FIGS. 12C to 12D show a second input function associated with the rotation of an object, the rotation of a screen, or screen zoom in/out.

As shown in FIG. 12A, the auxiliary input device 500 may receive a first input 1210 through the input module 530 arranged in the body 510, where the auxiliary input device 500 may then perform the screen movement 1220 corresponding to a moving direction and a moving degree indicated by the first input 1210 on a first screen 1201 output to the electronic device 200 to convert the first screen 1201 to a second screen 1203 as shown in FIG. 12B. According to an embodiment of the present disclosure, the first input 1210 may be an input swiping the touch surface of the input module 530.

According to an embodiment of the present disclosure, the electronic device 200 may move not only a screen (i.e., the screen movement 1220), but also an object (e.g., a 3D object). For example, in a case where an application for VR is a VR shopping mall application, the electronic device 200 may perform the screen movement 1220 in response to the first input 1210 provided through the auxiliary input device 500 to allow a user to look around a store and to move a certain product.

In addition, as shown in FIG. 12C, if the auxiliary input device 500 receives a second input through the first and second input modules 531 and 533 arranged in the body 510, the auxiliary input device 500 may perform a screen rotation 1240 corresponding to a rotation direction and a rotation degree indicated by the second input on a third screen 1205 output to the electronic device 200 to convert the third screen 1205 to a fourth screen 1207 as shown in FIG. 12D. According to an embodiment of the present disclosure, the second input may be an input simultaneously swiping touch surfaces of the first and second input modules 531 and 533 or swiping the touch surfaces of the first and second input modules 531 and 533 at regular time intervals. In FIG. 12C, the user may swipe the first input module 531 in a first direction using a thumb (1230*a*) and swipe the second input module 533 in a second direction using a finger (1230*b*).

According to an embodiment of the present disclosure, a first direction may be the same as or different from a second direction. In a case where the first and second directions are the same, the electronic device 200 may zoom in or zoom out the screen in response to a size of the swipe input. For example, in a case where the first and second directions are of the same direction, i.e., directed toward the electronic device 200, the electronic device 200 may zoom in the screen, and in a case where the first and second directions are directed toward an opposite direction to the electronic device 200, the electronic device 200 may zoom out the screen. In addition, in a case where the first and second directions are different from each other, i.e., directed toward opposite directions, the electronic device 200 may rotate a screen or an object. FIG. 12D shows the state where a certain product (e.g., shoes) is rotated due to the first direction swipe 1230*a* and the second direction swipe 1230*b* opposite to the first direction swipe 1230*a*.

In FIGS. 12A to 12D, the input module 530 of the auxiliary input device 500 may be implemented by a touch pad, but the auxiliary input device 500 may provide an input function using various input modules 530, such as the trackball 535, the wheel key 537, or the like.

Figure 13A:
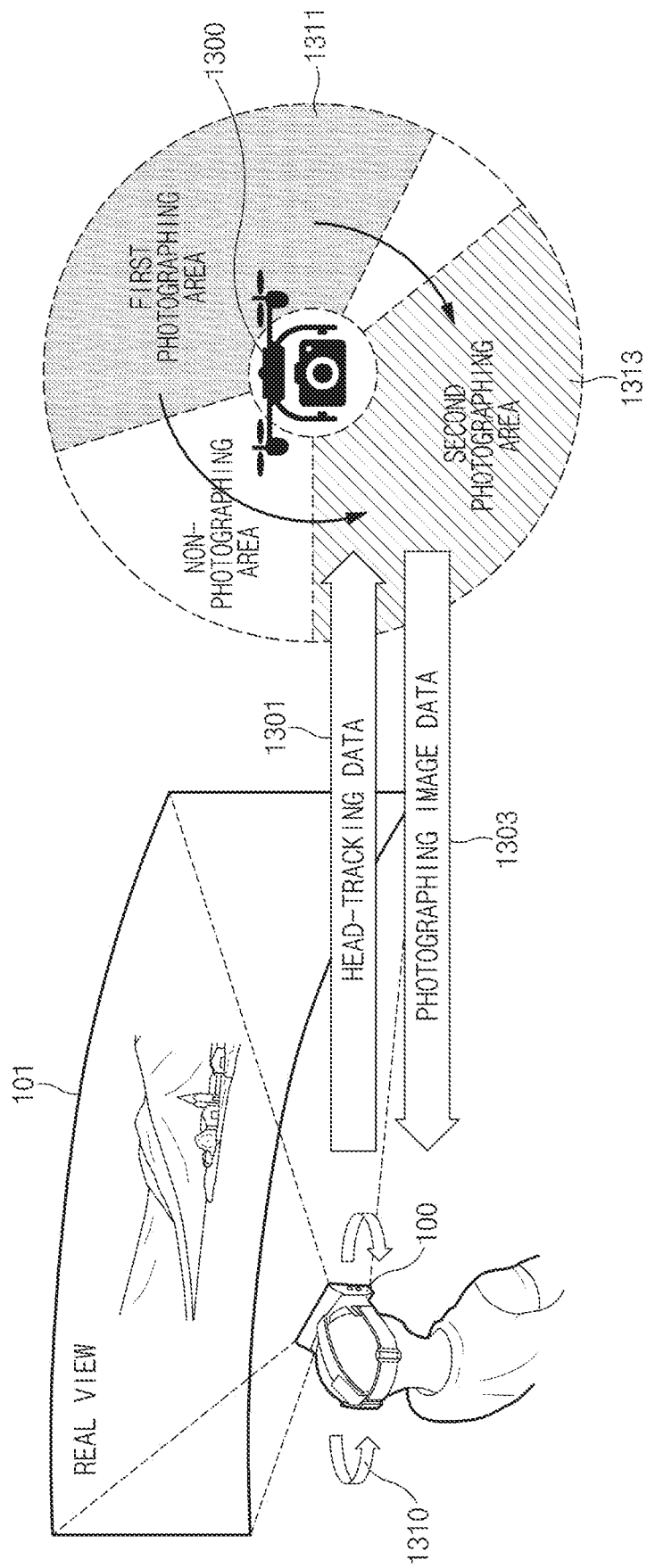
FIG. 13A is an illustration of a function sensing a movement of a user's head through an auxiliary input device according to an embodiment of the present disclosure.
Figure 13B:
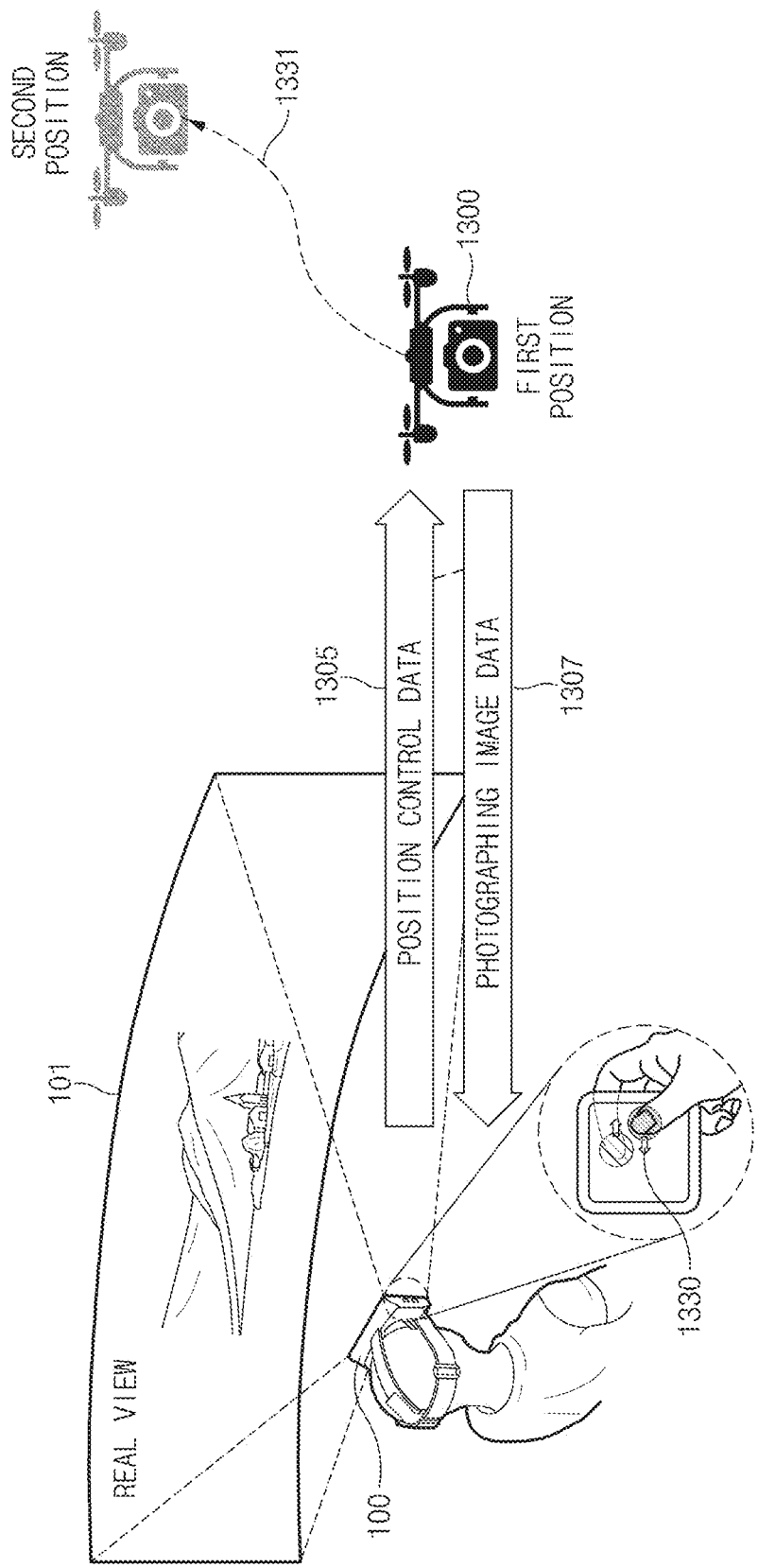
FIG. 13B is an illustration of a function receiving a user input through an auxiliary input device according to an embodiment of the present disclosure.

FIG. 13A is an illustration of a function sensing a movement of a user's head through an auxiliary input device according to an embodiment of the present disclosure, and FIG. 13B is an illustration of a function receiving a user input through an auxiliary input device according to an embodiment of the present disclosure.

According to an embodiment of the present disclosure, the electronic device 200 may control an external electronic device 1300 (e.g., a drone) paired with the electronic device 200. The drone 1300 may include a camera, and the electronic device 200 may control a flight of the drone 1300 and a field of view of the camera included in the drone 1300 using the input module of the auxiliary input device 500.

Referring to FIG. 13A, a user may receive image data photographed by the drone 1300 while wearing the HMD 100 and may experience a real-time virtual environment in the form of a real view 101. In this case, if the movement 1310 of the head of the user occurs, the electronic device 200 may apply head-tracking data 1301, which are sensed by a sensor module (e.g., an acceleration sensor, a gyro sensor, a geomagnetic field sensor, or the like) arranged in the auxiliary input device 500, the electronic device 200 (e.g., a mobile phone), or the HMD 100, to the drone 1300 paired with the electronic device 200.

The drone 1300 receiving the head-tracking data 1301 may analyze the head-tracking data 1301 and change the field of view of the camera to a second photographing area 1313 from a first photographing area 1311 based on the analyzed result. In addition, the drone 1300 may apply photographing image data 1303 in accordance with the changed field of view to the electronic device 200. Accordingly, a user may confirm the changed screen in the real view 101.

Referring to FIG. 13B, the electronic device 200 may control a flight of the drone 1300 through the input module 530 of the auxiliary input device 500. For example, in a case where a user swipes a touch surface of the input module 530 in a predetermined direction or zooms in or zooms out the screen using the first and second input modules 531 and 533, the electronic device 200 may apply position control data 1305 corresponding to a user input 1330 to the drone 1300 paired with the electronic device 200.

According to an embodiment of the present disclosure, the drone 1300 receiving the position control data 1305 may analyze the position control data 1305 and perform a position change 1331 to a second position from a first position based on the analyzed result. In addition, the drone 1300 may apply photographing image data 1307 at the changed position to the electronic device 200. Accordingly, a user may confirm the changed screen in the real view 101.

As described above, according to an embodiment of the present disclosure, a method of selecting a function of an electronic device coupled to a head-mounted display device may include determining whether an auxiliary input device including at least one of a sensor module or an input module is coupled to the head-mounted display device, providing an interface to select a first function and a second function of the electronic device when the auxiliary input device is coupled to the head-mounted display device, and changing an execution state of the electronic device based on a selected result of the first function or the second function.

According to an embodiment of the present disclosure, providing an interface may include outputting a first display object corresponding to a first function and a second display object corresponding to a second function to a display of an electronic device.

According to an embodiment of the present disclosure, changing an execution state may include switching an execution state to a first state in which an electronic device prepares a virtual reality function associated with a use of a head-mounted display device to be executed when the first function is selected.

According to an embodiment of the present disclosure, switching an execution state to a first state may include driving an application used for a virtual reality function, which is separated from a function displayed on a display of an electronic device.

According to an embodiment of the present disclosure, a function selection method may include switching a first state to a second state in which an execution screen of a virtual reality function is output when an electronic device is coupled to a head-mounted display device.

According to an embodiment of the present disclosure, changing an execution state may include switching an execution state to a third state in which a general function not associated with a use of a head-mounted display device is executed when a second function is selected.

According to an embodiment of the present disclosure, switching an execution state to a third state may include returning to a screen displayed on a display of an electronic device before an interface is provided.

According to an embodiment of the present disclosure, a function selection method may include pairing an auxiliary input device and an electronic device if the auxiliary input device is separated from the electronic device in a state where the electronic device is coupled to a head-mounted display device and the auxiliary input device is then coupled to the electronic device, wireless-transmitting at least one of sensing information obtained through a sensor module of the auxiliary input device or an input signal obtained through an input module of the auxiliary input device to the electronic device, and disabling the pairing when the auxiliary input device is re-coupled to the electronic device.

Figure 14:
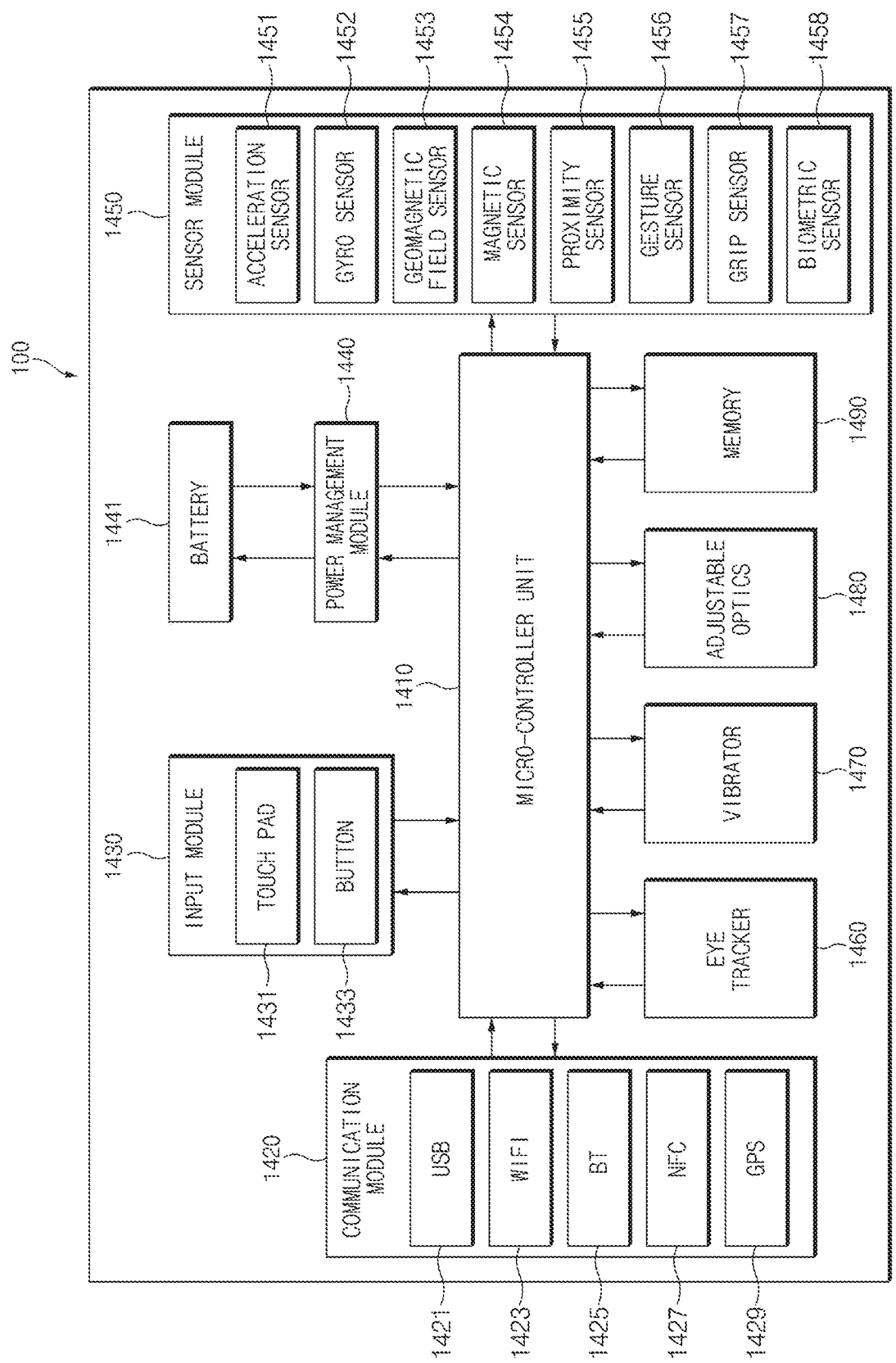
FIG. 14 is a block diagram of an HMD according to an embodiment of the present disclosure.

FIG. 14 is a block diagram of an HMD 100 according to an embodiment of the present disclosure.

Referring to FIG. 14, the HMD 100 according to an embodiment of the present disclosure may include a micro-controller unit (MCU) 1410, a communication module 1420, an input module 1430, a power management module 1440, a battery 1441, a sensor module 1450, an eye tracker 1460, a vibrator 1470, adjustable optics (or a lens assembly) 1480, and a memory 1490.

In FIG. 14, some components, e.g., a display, may not be shown for the convenience of explanation. According to an embodiment of the present disclosure, a portion of the components shown in FIG. 14 may be included in the main frame 110, and the other portion of the components shown FIG. 14 may be included in the electronic device 200 (e.g., an attachable and detachable smart phone) or the auxiliary input device 500.

The micro-controller unit 1410 may include, for example, a processor which may drive an operating system (OS) or an embedded software program to control a plurality of hardware components connected to the micro-controller unit 1410.

The communication module 1420 may connect the main frame 110 of the HMD 100 and the electronic device 200, e.g., a smart phone terminal, using wired and/or wireless communications to perform data transmission and reception. According to an embodiment of the present disclosure, the communication module 1420 may include a USB module 1421, a WiFi module 1423, a BT module 1425, an NFC module 1427, or a GPS module 1429. At least a portion (e.g., two or more) of the WiFi module 1423, the BT module 1425, the NFC module 1427, or the GPS module 1429 may be integrated into one integrated circuit (IC) or an IC package.

The input module 1430 may include a touch pad 1431 or a button 1433. The touch pad 1431 may recognize a touch input by using at least one of a capacitive method, a resistive method, an infrared method and an ultrasonic detecting method. In addition, the touch pad 1431 may include a control circuit. A capacitive type touch pad 1431 may recognize a physical contact or a proximity touch. The touch pad 1431 may include a tactile layer. In this case, the touch pad 1431 may provide a tactile reaction to a user. The button 1433 may include, for example, a physical button, an optical key, or a keypad.

The power management module 1440 may manage, for example, power of the HMD 100. According to an embodiment of the present disclosure, the power management module 1440 may include a power management integrated circuit (PMIC), a charger integrated circuit (charger IC), or a battery 1441 gauge. The PMIC may have a wired and/or wireless recharging scheme. The wireless recharging scheme may include, for example, a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure, for example, an amount of remaining power of the battery 1441, a voltage, a current, or a temperature while the battery 1441 is being charged. The battery may include, e.g., a rechargeable battery and/or a solar battery. If the electronic device 200 is connected to the HMD 100, the power management module 1440 may use a battery included in the electronic device 200. The power management module 1440 may manage power provided from an external power source.

The sensor module 1450 may measure, for example, a physical quantity or may detect an operation state of the HMD 100. The sensor module 1450 may convert the measured or detected information to an electrical signal. The sensor module 1450 may include, for example, at least one of an acceleration sensor 1451, a gyro sensor 1452, a geomagnetic field sensor 1453, a magnetic sensor 1454, a proximity sensor 1455, a gesture sensor 1456, a grip sensor 1457, or a biometric sensor 1458. According to an embodiment of the present disclosure, the movement of the head of a user wearing the HMD 100 may be sensed by using at least one of the acceleration sensor 1451, the gyro sensor 1452, or the geomagnetic field sensor 1453. It may be determined whether the HMD 100 is worn by a user by using the proximity sensor 1455 or the grip sensor 1457.

According to an embodiment of the present disclosure, at least a portion of components of the sensor module 1450 may be included in the electronic device 200 or the auxiliary input device 500, which is attachable or detachable. The sensor module 1450 may further include an infrared (IR) sensor, a pressure sensor, or a touch sensor and sense at least one of an IR radiation, pressure, a variation in an amount of capacitance (or dielectric constant) to determine whether a user is wearing the HMD 100.

The gesture sensor 1456 may sense a movement of a user's hand or finger and receive an input operation of the HMD 100. Additionally or alternatively, the sensor module 1450 may recognize biometric information of a user using an electronic nose (E-nose) sensor, an electromyography sensor (EMG) sensor, an electroencephalogram (EEG) sensor, an electrocardiogram (ECG) sensor, an iris sensor, and/or a fingerprint sensor. The sensor module 1450 may include a control circuit for controlling at least one or more sensors included therein. According to an embodiment of the present disclosure, the HMD 100 may include a processor which is a part of the micro-controller unit 1410 or independent of the micro-controller unit 1410 and is configured to control the sensor module 1450. The processor may control the sensor module 1450 while the micro-controller unit 1410 is in a sleep state.

The eye tracker 1460 may track the eyes of a user by using at least one of electrical oculography (EOG) sensors, coil systems, dual-Purkinje systems, bright pupil systems, or dark pupil systems. In addition, the eye tracker 1460 may include a micro camera to track a user's eyes.

The vibrator 1470 may convert an electrical signal to a mechanical vibration and generate a vibration or haptic effect.

The adjustable optics 1480 may measure an inter-pupil distance (IPD) of a user and control a distance of a lens and a display position of the electronic device 200 to allow the user to view an image appropriate to his/her eyesight.

The memory 1490 may include an internal memory or an external memory. The internal memory may include, for example, at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM)), a mask ROM, a flash ROM, a flash memory (e.g., a NAND flash memory or a NOR flash memory), a hard drive, or a solid state drive (SSD). The external memory may include a flash drive, for example, a compact flash (CF) drive, a secure digital (SD) drive, a micro secure digital (Micro-SD) drive, a mini secure digital (Mini-SD) drive, an extreme digital (xD) drive, a multimedia card (MMC), a memory stick, or the like. The external memory may be functionally and/or physically connected to the HMD 100 through various interfaces.

The memory 1490 may store instructions or data associated with at least one other component of the HMD 100. According to an embodiment of the present disclosure, the memory 1490 may store software and/or a program. The program may include, for example, a kernel, middleware, an application programming interface (API), and/or an application program (or an application). At least a portion of the kernel, the middleware, or the API may be referred to as an operating system (OS).

A kernel may control or manage system resources (e.g., the micro-controller unit 1410 or the memory 1490) that are used to execute operations or functions of other programs (e.g., middleware, an API, and an application program). Furthermore, a kernel may provide an interface that allows middleware, an API, or an application program to access discrete components of the HMD 100 so as to control or manage system resources.

Middleware may perform a mediation role such that an API or application program communicates with a kernel to exchange data. Furthermore, middleware may process task requests received from an application program according to a priority. For example, middleware may assign a priority, which makes it possible to use a system resource (e.g., the micro-controller unit 1410, the memory 1490, or the like) of the HMD 100, to at least one of an application program. For example, middleware may process one or more task requests according to a priority assigned to at least one application program, which makes it possible to perform scheduling or load balancing on one or more task requests.

An API may be an interface through which an application program controls a function provided by a kernel or middleware and may include, for example, at least one interface or function (e.g., an instruction) for file control, window control, image processing, character control, or the like.

An application may include a short message service/multimedia messaging service (SMS/MMS) application, an email application, a calendar application, an alarm application, a health care application (e.g., an application measuring an exercise quantity or blood sugar level), or an environmental application (e.g., atmospheric pressure, humidity, or temperature). Additionally or alternatively, an application may include an application associated with information exchange between the HMD 100 and the electronic device 200. The information exchanging application may include, for example, a notification relay application for transmitting certain information to the electronic device 200, or a device management application for managing the electronic device 200.

A notification relay application may include a function of transmitting notification information, which arises from other applications (e.g., applications for SMS/MMS, e-mail, health care, or environmental information) of the HMD 100 to the electronic device 200. Additionally, a notification relay application may receive, for example, notification information from the electronic device 200 and provide the notification information to a user.

A device management application may manage (e.g., install, delete, or update), for example, at least one function (e.g., turn-on/turn-off an external electronic device (or a part of components) or adjustment of brightness (or resolution) of a display) of the electronic device 200, which communicates with the HMD 100, an application running in the electronic device 200, or a service (e.g., a call service or a message service) provided from the electronic device 200.

FIGS. 15A and 15B are illustrations of a normal mode, a head-mounted mode (HMM), and a VR mode according to an embodiment of the present disclosure.

The HMM mode or the VR mode may provide at least one of a see-through function for providing an augmented reality (AR) and a see-closed function for providing a virtual reality (VR). For example, in a case where a smart phone is installed at the main frame 110 of the HMD 100 as the electronic device 200 and operated, the operation mode of the smart phone may be switched to the HMM mode or the VR mode from a normal mode. In the HMM mode or the VR mode, one image may be displayed after being divided into two images. According to an embodiment of the present disclosure, an image in the HMM or VR mode may be distorted by the lens 270 included in the main frame 110, and, thus, a plane image may be inversely distorted using characteristics of the lens 270 to provide a user with an image that is not distorted.

Figure 16A:
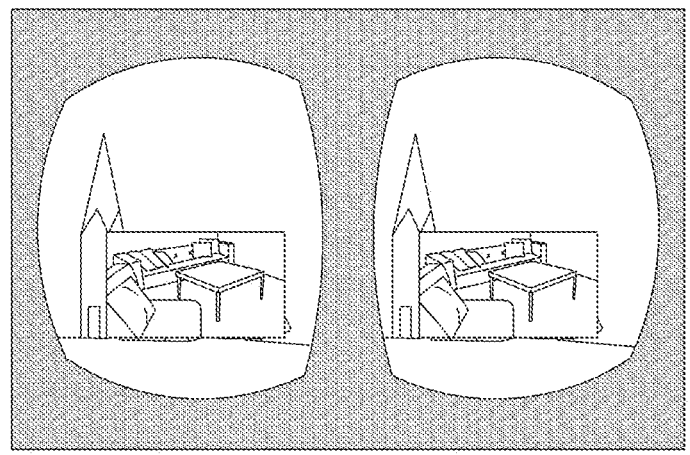
FIGS. 16A and 16B are illustrations of an HMD providing a see-through mode using a rear view camera of a smart phone according to an embodiment of the present disclosure.
Figure 16B:
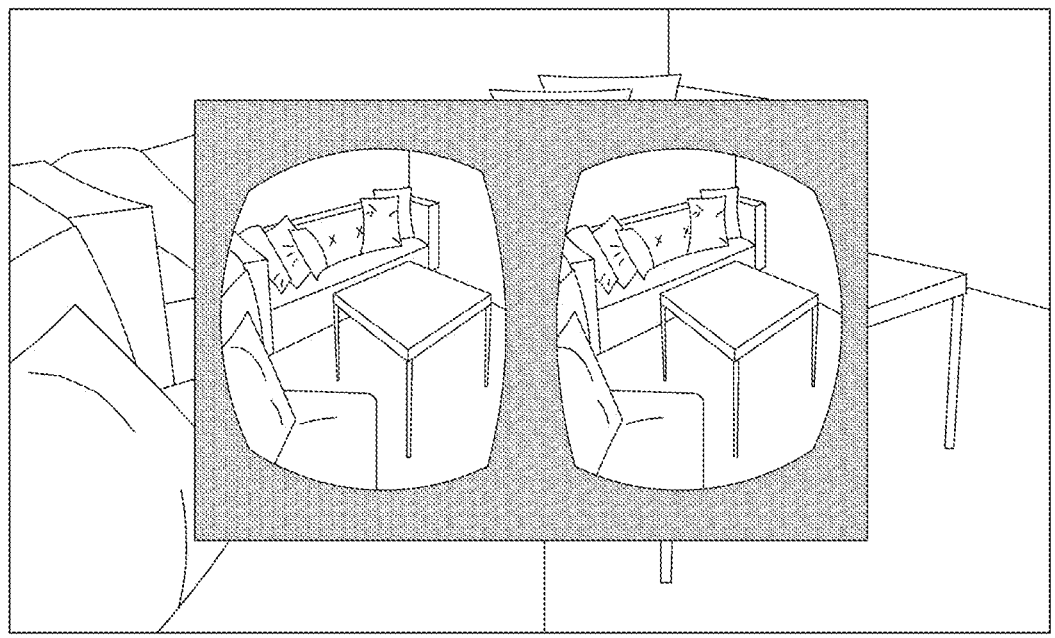

FIGS. 16A and 16B are illustrations of the HMD 100 providing a see-through mode using a rear view camera of the smart phone according to an embodiment of the present disclosure.

Referring to FIGS. 16A and 16B, in a case where a smart phone is installed at the main frame 110 as the electronic device 200 and operated, the HMD 100 may provide a see-through mode using a rear view camera of the smart phone. According to an embodiment of the present disclosure, when a see-through mode switching button is pushed during a VR mode, a rear view camera is activated, and, thus, the see-through mode is provided. In this case, a preview screen of the rear view camera may be displayed in a picture-in-picture (PIP) mode through a certain area of a VR screen, or the preview screen of the rear view camera may be displayed through an entire area of a screen after the VR screen is switched to a background image. Thus, a user may explore an external virtual environment and substantially simultaneously confirm a surrounding environment through a camera image.

The term "module" used herein may represent, for example, a unit including one or more combinations of hardware, software and firmware. The term "module" may be interchangeably used with the terms "unit," "logic," "logical block," "component," and "circuit." The term "module" may indicate a minimum unit of an integrated component or may be a part thereof. The term "module" may indicate a minimum unit for performing one or more functions or a part thereof. The term "module" may be implemented mechanically or electronically. For example, the term "module" according to an embodiment of the present disclosure may include at least one of an application-specific IC (ASIC), a field-programmable gate array (FPGA), and a programmable-logic device for performing some operations, which are known or will be developed.

According to an embodiment of the present disclosure, at least a portion of an apparatus (e.g., modules or functions thereof) or a method (e.g., operations), for example, may be implemented by instructions stored in a non-transient computer-readable storage medium in the form of a programmable module. An instruction, when executed by one or more processors (e.g., an application processor), may perform a function corresponding to the instruction. A non-transient computer-readable storage medium, for example, may be the memory 1490.

A non-transient computer-readable storage medium may include a hard disk, a floppy disk, a magnetic media (e.g., a magnetic tape), an optical media (e.g., compact disc ROM (CD-ROM) and a DVD), a magneto-optical media (e.g., a floptical disk), and a hardware device (e.g., ROM, RAM, a flash memory, or the like). Also, a program instruction may include not only machine code generated by a compiler but also high-level source code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

While the present disclosure has been shown and described with reference to various embodiments thereof, it will be understood by those skilled in the art that various changes in form and details may be made therein without departing from the scope of the present disclosure as defined by the appended claims and their equivalents.

What is claimed is:
1. A head-mounted device, comprising:
 a main frame couplable to an electronic device; and
 a support part for mounting the main frame to a user's head so that the electronic device faces the user's face; and
 an auxiliary input device including:

a body including an input module configured to process an input signal for controlling the electronic device and a sensor module configured to sense movement of the user's head;

an extension part extending from the body and configured to allow the body to be rotated or folded with respect to the electronic device; and a connection part extending from the extension part to an external interface terminal of the electronic device and configured to serve as a path through which the input signal and the sensing information are transmitted to the electronic device.

2. The head-mounted device of claim 1, wherein the sensor module comprises at least one of an acceleration sensor, a gyro sensor, and a geomagnetic field sensor.

3. The head-mounted device of claim 1, wherein the input module comprises at least one of a touch pad, a trackball, and a wheel key.

4. The head-mounted device of claim 1, wherein the auxiliary input device further comprises a communication module, wherein the communication module is configured to transmit at least one of the input signal and the sensing information to the electronic device in a wireless manner.

5. The head-mounted device of claim 1, wherein the extension part is configured to have at least two rotational degrees of freedom with respect to the electronic device.

6. The head-mounted device of claim 1, wherein the extension part includes a movement member, and wherein the moving member is inserted into a hole formed in the at least one surface of the body to have a length and a width, wherein one end of the moving member inserted in the hole is stuck in the hole such that the moving member is not separated from the hole.

7. The head-mounted device of claim 6, wherein the hole is formed in at least one of a vertical direction and a horizontal direction on the at least one surface of the body to have the length.

8. The head-mounted device of claim 7, wherein the hole extends to another surface connected to the at least one surface of the body and is formed in a portion of the another surface connected to the at least one surface, and wherein the moving member is configured to move to the extension portion of the hole such that the extension part is bent or folded with respect to the body within an angle.

9. The head-mounted device of claim 8, wherein the moving member comprises an elastic material as at least a portion thereof, wherein the moving member is configured to be deformed or restored due to an elastic force if the extension part is bent or folded with respect to the body within the angle.

10. The head-mounted device of claim 5, wherein the extension part further comprises a rotation member therein, wherein the rotation member is configured to allow the extension part to rotate about a normal line of the at least one surface of the body within an angle.

11. The head-mounted device of claim 10, wherein the rotation member is inserted into a hollow formed in the extension part and stuck in the hollow such that the rotation member is not separated from the extension part.

12. The head-mounted device of claim 11, wherein the connection part is connected to one surface of the main frame and electrically connected to the electronic device through an electrical connection part disposed on the main frame if the electronic device is installed at the main frame.

\* \* \* \* \*